(12) United States Patent
Onggosanusi et al.

(10) Patent No.: US 12,413,368 B2
(45) Date of Patent: Sep. 9, 2025

(54) METHOD AND APPARATUS FOR MULTIPLEXING CHANNEL STATE INFORMATION

(71) Applicant: Samsung Electronics Co., Ltd., Suwon-si (KR)

(72) Inventors: Eko Onggosanusi, Coppell, TX (US); Md Saifur Rahman, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 17/129,578

(22) Filed: Dec. 21, 2020

(65) Prior Publication Data

US 2021/0111853 A1 Apr. 15, 2021

Related U.S. Application Data

(63) Continuation of application No. 15/833,746, filed on Dec. 6, 2017, now Pat. No. 10,873,439.

(Continued)

(51) Int. Cl.
*H04L 5/00* (2006.01)
*H04B 7/0417* (2017.01)
(Continued)

(52) U.S. Cl.
CPC ......... *H04L 5/0057* (2013.01); *H04B 7/0417* (2013.01); *H04B 7/0486* (2013.01);
(Continued)

(58) Field of Classification Search
None
See application file for complete search history.

(56) References Cited

U.S. PATENT DOCUMENTS 9,509,383 B2 * 11/2016 Kim ..................... H04B 7/0478
10,128,927 B2 * 11/2018 Einhaus ............... H04B 17/345
(Continued)

FOREIGN PATENT DOCUMENTS

CN 104040907 A 9/2014
CN 104604283 A 5/2015
(Continued)

OTHER PUBLICATIONS

IP Australia, "Examination report No. 1 for standard patent application" issued Nov. 25, 2021, in connection with counterpart Australian Patent Application No. 2017374457, 3 pages.
(Continued)

*Primary Examiner* — Wutchung Chu
*Assistant Examiner* — Berhanu D Belete

(57) ABSTRACT

For multiplexing channel state information (CSI), a user equipment (UE) includes a transceiver configured to receive configuration information for CSI reporting and a processor configured to decode the configuration information and calculate a CSI according to the configuration information. The transceiver is configured to transmit the calculated CSI on an uplink (UL) channel, where the CSI includes N segments and is transmitted in one slot, where N>1. A first of the N segments includes a rank indicator (RI) and at least one other CSI parameter. A base station (BS) includes a processor configured to generate configuration information for CSI reporting and a transceiver configured to transmit, to a UE, the configuration information via a downlink (DL) channel; and receive, from the UE, a CSI report calculated in accordance with the configuration information on an uplink UL channel.

23 Claims, 20 Drawing Sheets

Related U.S. Application Data

(60) Provisional application No. 62/559,287, filed on Sep. 15, 2017, provisional application No. 62/558,078, filed on Sep. 13, 2017, provisional application No. 62/521,848, filed on Jun. 19, 2017, provisional application No. 62/501,492, filed on May 4, 2017, provisional application No. 62/470,633, filed on Mar. 13, 2017, provisional application No. 62/462,431, filed on Feb. 23, 2017, provisional application No. 62/446,145, filed on Jan. 13, 2017, provisional application No. 62/435,536, filed on Dec. 16, 2016.

(51) Int. Cl.
  *H04B 7/0456* (2017.01)
  *H04B 7/06* (2006.01)
  *H04W 72/0446* (2023.01)
  *H04W 72/21* (2023.01)
  *H04W 72/542* (2023.01)
  *H04W 72/563* (2023.01)

(52) U.S. Cl.
  CPC ....... *H04W 72/0446* (2013.01); *H04W 72/21* (2023.01); *H04W 72/542* (2023.01); *H04W 72/563* (2023.01); *H04B 7/0478* (2013.01); *H04B 7/0626* (2013.01); *H04B 7/0632* (2013.01)

(56) References Cited

U.S. PATENT DOCUMENTS

| | | | | |
|---|---|---|---|---|
| 10,735,070 | B2* | 8/2020 | Wei | H04B 7/0626 |
| 2010/0027456 | A1* | 2/2010 | Onggosanusi | H04B 7/024 |
| | | | | 370/312 |
| 2011/0243012 | A1* | 10/2011 | Luo | H04L 5/0057 |
| | | | | 370/252 |
| 2012/0069833 | A1* | 3/2012 | Molnar | H04L 1/0045 |
| | | | | 370/342 |
| 2012/0087254 | A1* | 4/2012 | Yin | H04L 1/1861 |
| | | | | 370/252 |
| 2012/0127869 | A1* | 5/2012 | Yin | H04W 28/06 |
| | | | | 370/252 |
| 2012/0182944 | A1* | 7/2012 | Sorrentino | H04L 5/0044 |
| | | | | 370/329 |
| 2012/0250549 | A1* | 10/2012 | Lee | H04L 5/0048 |
| | | | | 370/252 |
| 2013/0021980 | A1* | 1/2013 | Yang | H04L 5/0055 |
| | | | | 370/328 |
| 2013/0088978 | A1* | 4/2013 | Mondal | H04L 1/0029 |
| | | | | 370/312 |
| 2013/0170437 | A1* | 7/2013 | Onggosanusi | H04B 7/024 |
| | | | | 370/328 |
| 2013/0182789 | A1 | 7/2013 | Ko et al. | |
| 2013/0195045 | A1 | 8/2013 | Papasakellariou et al. | |
| 2013/0301448 | A1 | 11/2013 | Sayana et al. | |
| 2013/0322398 | A1* | 12/2013 | Jang | H04L 5/0057 |
| | | | | 370/329 |
| 2014/0044109 | A1* | 2/2014 | Nogami | H04W 72/085 |
| | | | | 370/336 |
| 2014/0177545 | A1 | 6/2014 | Nammi | |
| 2014/0227987 | A1* | 8/2014 | Seo | H04W 24/10 |
| | | | | 455/115.1 |
| 2014/0328422 | A1 | 11/2014 | Chen et al. | |
| 2014/0341055 | A1* | 11/2014 | Fan | H04B 7/0621 |
| | | | | 370/252 |
| 2015/0078271 | A1* | 3/2015 | Kim | H04L 5/005 |
| | | | | 370/329 |
| 2015/0109949 | A1* | 4/2015 | Xia | H04B 7/0626 |
| | | | | 370/252 |
| 2015/0146634 | A1* | 5/2015 | Hwang | H04L 1/0057 |
| | | | | 370/329 |
| 2015/0189644 | A1 | 7/2015 | Lorca Hernando | |
| 2015/0200754 | A1* | 7/2015 | Sayana | H04L 5/0053 |
| | | | | 370/328 |
| 2015/0223236 | A1* | 8/2015 | Ko | H04W 72/23 |
| | | | | 370/280 |
| 2015/0318910 | A1 | 11/2015 | Ahn et al. | |
| 2015/0326369 | A1 | 11/2015 | Kim et al. | |
| 2016/0007339 | A1* | 1/2016 | Kim | H04L 1/0027 |
| | | | | 370/329 |
| 2016/0050003 | A1 | 2/2016 | Ko et al. | |
| 2016/0149626 | A1* | 5/2016 | Frenne | H04B 7/0473 |
| | | | | 375/267 |
| 2016/0329945 | A1* | 11/2016 | Onggosanusi | H04B 7/0478 |
| 2016/0330004 | A1* | 11/2016 | Kim | H04L 5/0048 |
| 2017/0126298 | A1* | 5/2017 | Einhaus | H04B 7/0632 |
| 2017/0201308 | A1* | 7/2017 | Park | H04W 16/14 |
| 2017/0353222 | A1* | 12/2017 | Wei | H04B 7/0478 |
| 2018/0034612 | A1* | 2/2018 | Lin | H04L 25/0224 |
| 2018/0091273 | A1 | 3/2018 | Choi et al. | |
| 2019/0045460 | A1* | 2/2019 | Muruganathan | H04W 52/367 |
| 2019/0089423 | A1* | 3/2019 | Davydov | H04B 7/0479 |
| 2020/0358507 | A1* | 11/2020 | Wei | H04B 7/0469 |

FOREIGN PATENT DOCUMENTS

| | | |
|---|---|---|
| CN | 104956717 A | 9/2015 |
| CN | 105162509 A | 12/2015 |
| CN | 105191392 A | 12/2015 |
| CN | 105207707 A | 12/2015 |
| CN | 105450360 A | 3/2016 |
| CN | 105721032 A | 6/2016 |
| EP | 3480970 A1 | 5/2019 |
| EP | 4465579 A2 | 11/2024 |
| JP | 2016517192 A | 6/2016 |
| KR | 20140119055 A | 10/2014 |
| WO | 2014129843 A1 | 8/2014 |
| WO | 2016159621 A1 | 10/2016 |
| WO | 2016179565 A1 | 11/2016 |

OTHER PUBLICATIONS

China National Intellectual Property Administration (CNIPA), "The First Office Action" issued Sep. 18, 2021, in connection with counterpart Chinese Patent Application No. 201780076819.8, 14 pages.

Korean Intellectual Property Office, "Office Action" issued Nov. 30, 2021, in connection with counterpart Korean Patent Application No. 10-2019-7012963, 12 pages.

Intellectual Property India, Examination Report issued Dec. 21, 2021 regarding Application No. 201937020139, 7 pages.

IP Australia, Examination Report No. 1 issued May 15, 2023 regarding Application No. 2022204501, 3 pages.

Indonesian Patent Office, Office Action issued Jun. 23, 2023 regarding Application No. P00202201277, 5 pages.

Korean Intellectual Property Office, Decision of Patent issued Aug. 24, 2022 regarding Application No. 10-2019-7012963, 9 pages.

Japanese Patent Office, Notice of Allowance issued Nov. 7, 2022 regarding Application No. 2019-531950, 7 pages.

Ericsson, "UCI on sPUSCH with short TTI", 3GPP TSG-RAN WG1 #87, R1-1613393, Nov. 2016, 3 pages.

Chinese National Intellectual Property Administration, Notification of Decision to Grant issued May 10, 2022 regarding Application No. 201780076819.8, 10 pages.

"Correction on UE procedure for reporting CSI and HARQ-ACK", 3GPP TSG-RAN WG1 Meeting #65, R1-111569, May 2011, 19 pages.

Intellectual Property India, Examination Report issued Feb. 13, 2023 regarding Application No. 202238015771, 7 pages.

Japanese Patent Office, Notice of Allowance issued May 13, 2024 regarding Application No. 2022-195732, 6 pages.

Canadian Intellectual Property Office, Examination Report issued May 15, 2024 regarding Application No. 3,047,229, 3 pages.

Indian Patent Office, Hearing Notice issued Jul. 24, 2024 regarding Application No. 202238015771, 3 pages.

(56) References Cited

OTHER PUBLICATIONS

Extended European Search Report issued Sep. 16, 2024 regarding Application No. 24179055.9, 10 pages.
Samsung, "CSI Reporting and UCI Multiplexing", 3GPP TSG RAN WG1 Meeting #90, R1-1713589, Aug. 2017, 4 pages.
Chinese National Intellectual Property Administration, Office Action issued Sep. 30, 2024 regarding Application No. 202210913147.4, 11 pages.
Qualcomm Incorporated, "CR on aperiodic CSI reporting for triggered UL grants in LAA", 3GPP TSG-RAN WG1 Meeting #86bis, R1-1613772, Oct. 2016, 10 pages.
Chinese National Intellectual Property Administration, Decision to Grant issued Mar. 13, 2025 regarding Application No. 202210913147.4, 7 pages.

* cited by examiner

METHOD AND APPARATUS FOR MULTIPLEXING CHANNEL STATE INFORMATION

PRIORITY

This application is a continuation of U.S. Non-Provisional patent application Ser. No. 15/833,746 filed Dec. 6, 2017, and claims priority to U.S. Provisional Patent Application No. 62/435,536 filed Dec. 16, 2016; U.S. Provisional Patent Application No. 62/446,145 filed Jan. 13, 2017; U.S. Provisional Patent Application No. 62/462,431 filed Feb. 23, 2017; U.S. Provisional Patent Application No. 62/470,633 filed Mar. 13, 2017; U.S. Provisional Patent Application No. 62/501,492 filed May 4, 2017; U.S. Provisional Patent Application No. 62/521,848 filed Jun. 19, 2017; U.S. Provisional Patent Application No. 62/558,078 filed Sep. 13, 2017; and U.S. Provisional Patent Application No. 62/559,287 filed Sep. 15, 2017. The above-identified provisional patent applications are hereby incorporated by reference in their entirety.

TECHNICAL FIELD

The present disclosure relates generally to methods for enabling channel state information (CSI) multiplexing. Such methods can be used when a user equipment is equipped with a plurality of transmit antennas and transmit-receive units.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CSI multiplexing.

In one embodiment, a user equipment (UE) is provided. The UE includes a transceiver configured to receive configuration information for CSI reporting. The UE further includes a processor operably connected to the transceiver. The processor is configured to decode the configuration information and calculate a CSI according to the configuration information. The transceiver is further configured to transmit the calculated CSI on an uplink (UL) channel. The CSI includes N segments and is transmitted in one slot, where N>1. A first of the N segments includes a rank indicator (RI) and at least one other CSI parameter.

In another embodiment, a base station (BS) is provided. The BS includes a processor configured to generate configuration information for CSI reporting. The BS further includes a transceiver operably connected to the processor. The transceiver is configured to transmit, to a UE, the configuration information via a downlink (DL) channel; and receive, from the UE, a CSI report calculated in accordance with the configuration information on an uplink UL channel. The CSI includes N segments and is transmitted in one slot, where N>1. A first of the N segments includes a rank indicator (RI) and at least one other CSI parameter.

In another embodiment, a method for operating a UE is provided. The method includes receiving and decoding configuration information for CSI reporting, calculating a CSI according to the configuration information, and transmitting the calculated CSI on an UL. The CSI includes N segments and is transmitted in one slot where N>1. A first of the N segments includes a RI and at least one other CSI parameter.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
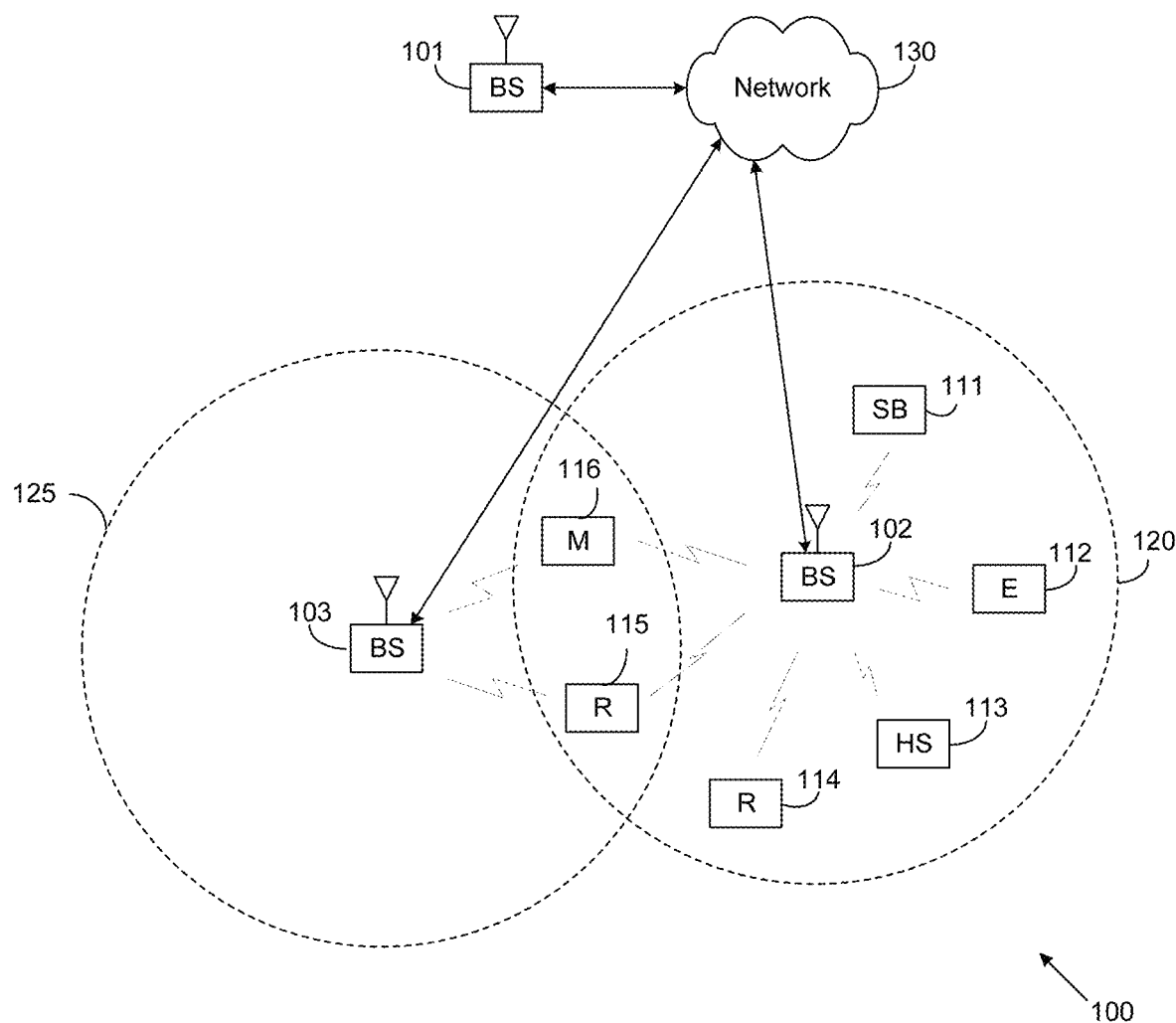
FIG. 1 illustrates an example wireless network according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List of Acronyms

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); and 3GPP TS 36.331 version 12.4.0, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for multiplexed CSI reporting as described in embodiments of the present disclosure. In various embodiments, one or more of UEs 111-116 generate and report multiplexed CSI.

Although FIG. 1 illustrates one example of a wireless network 100, various changes can be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
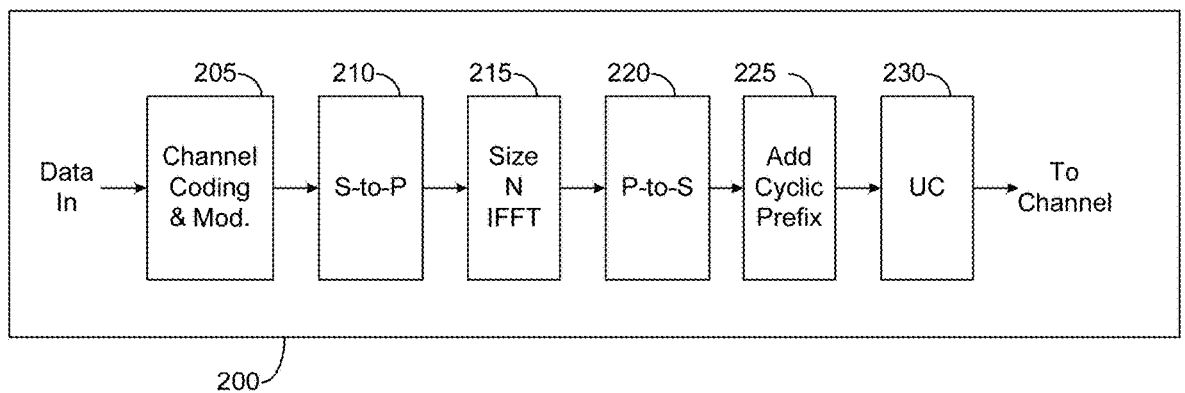
FIGS. 2A and 2B illustrate example wireless transmit and receive paths according to various embodiments of the present disclosure.
Figure 2B:
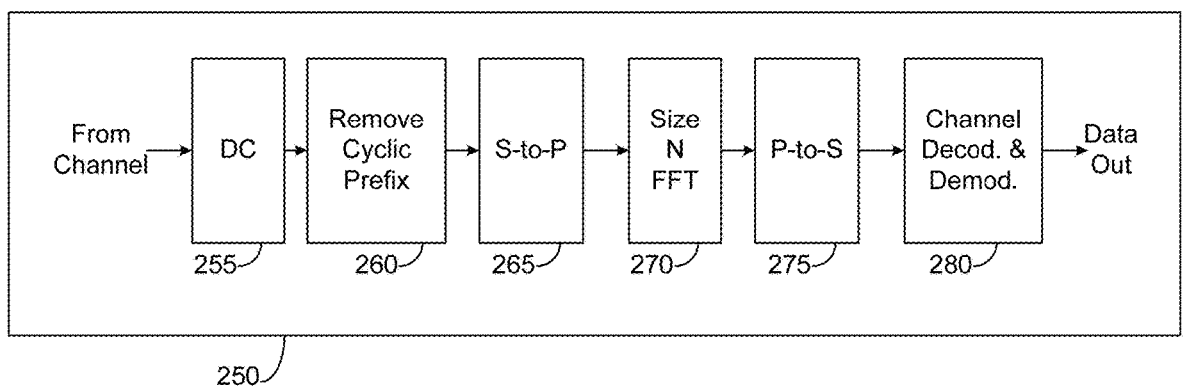

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 could be implemented in a gNB and that the transmit path 200 could be implemented in a UE. In some embodiments, the receive path 250 is configured to generate and report multiplexed CSI as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for multiplexed CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
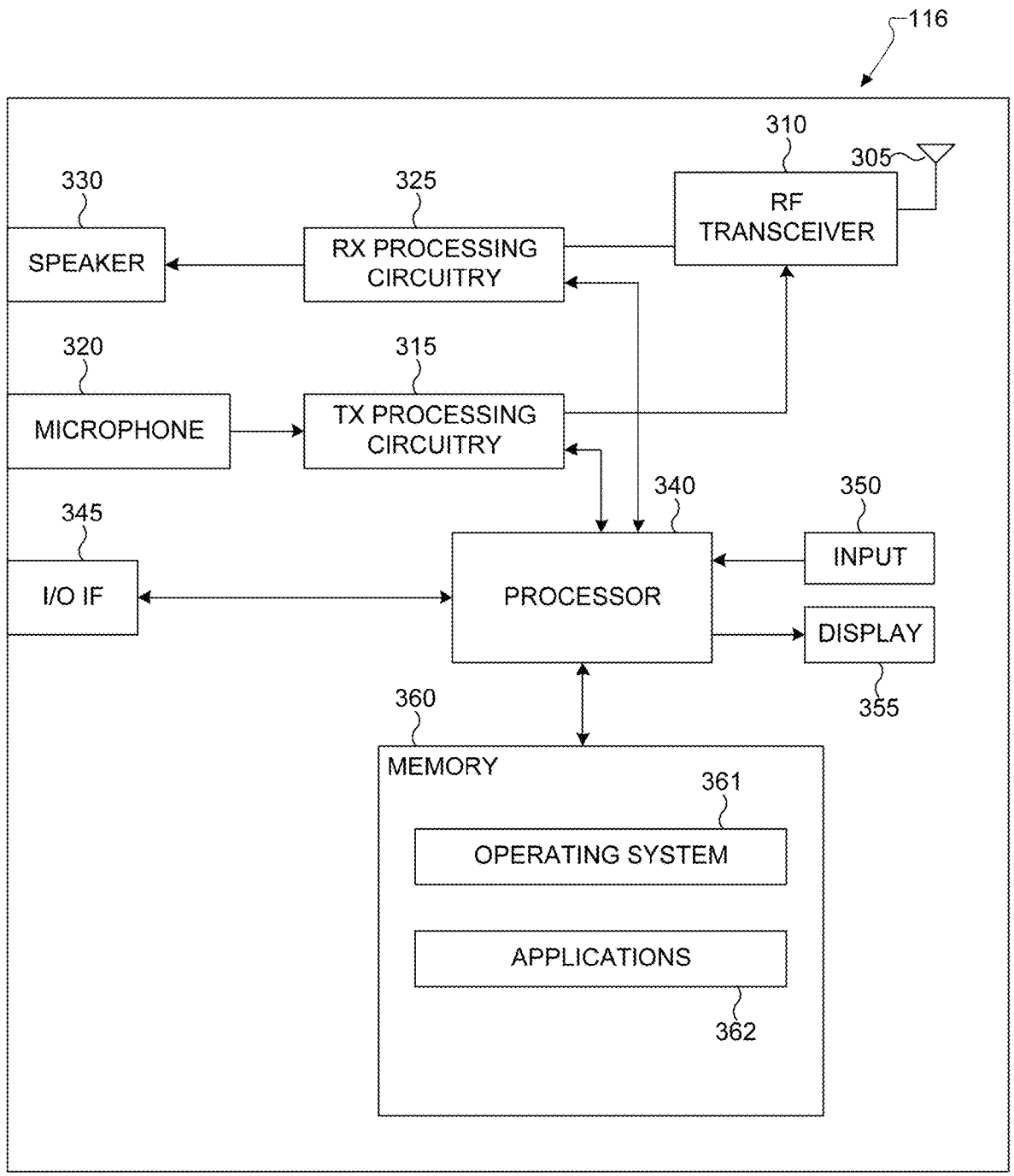
FIG. 3A illustrates an example UE according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for multiplexed CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
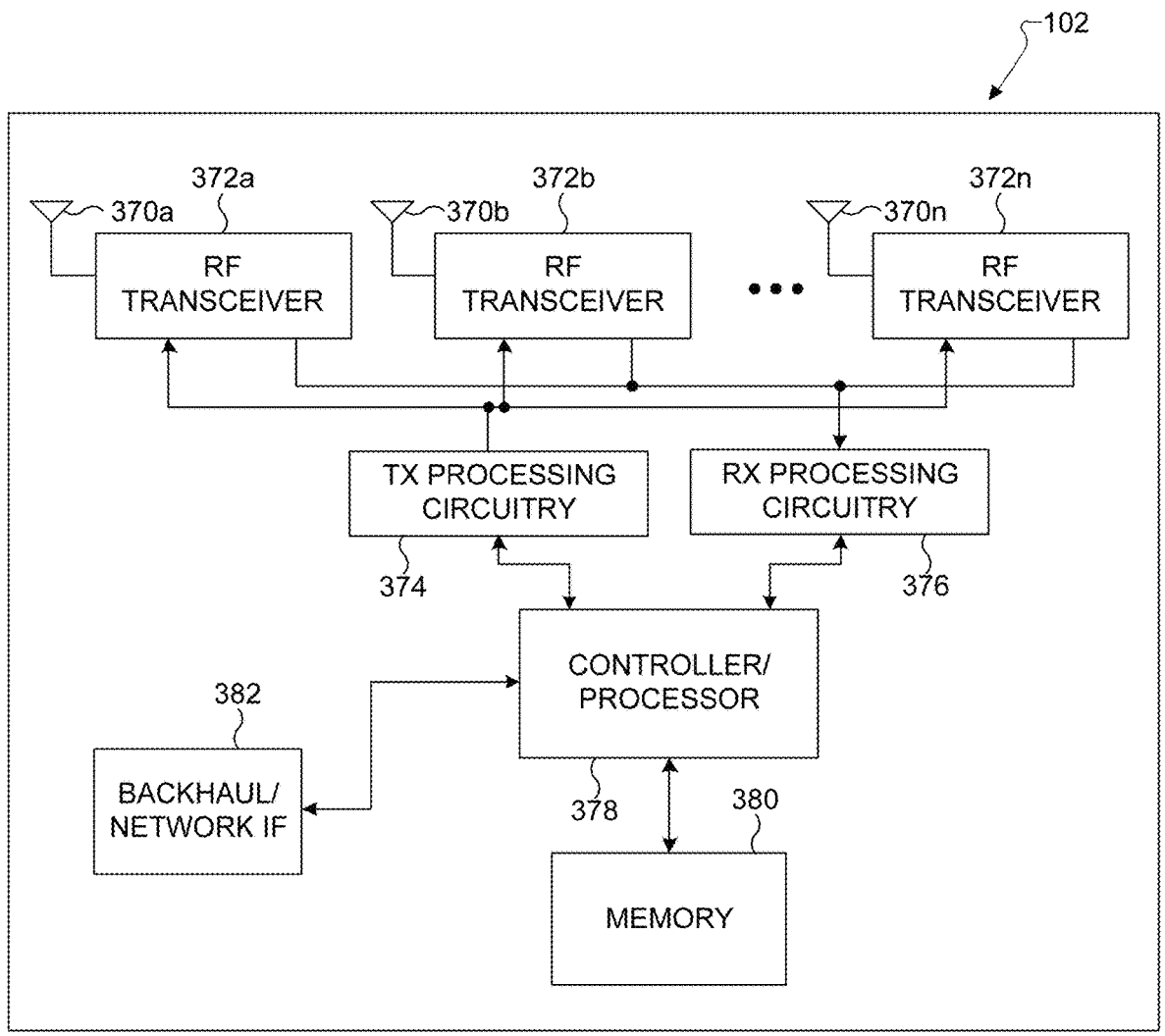
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 could support communications over any suitable wired or wireless connection(s). For example, when the gNB 102 is implemented as part of a cellular communication system (such as one supporting 5G or new radio access technology or NR, LTE, or LTE-A), the backhaul or network interface 382 could allow the gNB 102 to communicate with other gNBs over a wired or wireless backhaul connection. When the gNB 102 is implemented as an access point, the backhaul or network interface 382 could allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions is configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) receive and decode multiplexed CSI.

Although FIG. 3B illustrates one example of a gNB 102, various changes can be made to FIG. 3B. For example, the gNB 102 could include any number of each component shown in FIG. 3A. As a particular example, an access point could include a number of backhaul or network interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
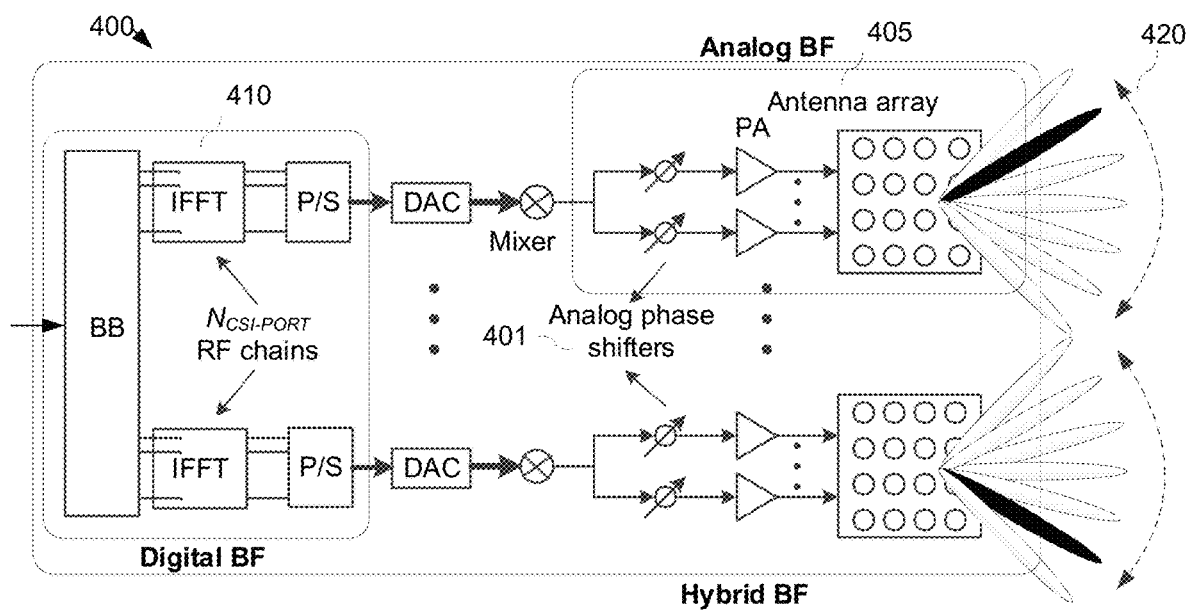
FIG. 4 illustrates an example beamforming architecture wherein one CSI-RS port is mapped onto a large number of analog-controlled antenna elements.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in embodiment 400 of FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is an important factor. For this reason, three types of CSI reporting mechanism corresponding to three types of CSI-RS measurement behavior are supported in Rel.13 LTE: 1) 'CLASS A' CSI reporting which corresponds to non-precoded CSI-RS; 2) 'CLASS B' reporting with K=1 CSI-RS resource which corresponds to UE-specific beamformed CSI-RS; and 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (which includes multiple ports). Here, (at least at a given time/frequency) CSI-RS ports have narrow beam widths and hence not cell wide coverage, and (at least from the gNB perspective) at least some CSI-RS port-resource combinations have different beam directions.

In LTE, depending on the number of transmission layers, a maximum of two codewords are used for DL and UL data transmissions (on DL data channel such as PDSCH or PDCH, and UL data channel such as PUSCH or PUCH, respectively) for spatial multiplexing. For L=1 layer, one codeword is mapped to one layer. For L>1 layers, each of the two codewords is mapped to at least one layer where L layers (rank-L) are divided almost evenly across the two codewords. In addition, one codeword can also be mapped to >1 layers especially when only one of the two codewords is to be retransmitted.

Although beneficial for facilitating modulation-and-coding-scheme (MCS) adaptation per codeword (CW) and MMSE-SIC (MMSE with successive interference cancellation) receiver, it costs some significant overhead over a single CW mapping. DL overhead comes from the additional DCI payload due to 2 fixed MCS fields and 2 fixed NDI-RV (DL HARQ related) fields. UL overhead comes from the need for two CQIs (full 4-bit+delta 3-bit for wideband CQI, and 2× overhead for subband CQI) for rank>1 and two DL HARQ-ACKs for rank>1. Added to that is the complexity of having to accommodate more than one layer mapping schemes in case of retransmission. Furthermore, when distributed MIMO such as non-coherent joint transmission (NC-JT) is incorporated into design requirements for 5G NR, the number of codewords (CWs) used for DL and UL transmissions per UE can increase with the number of TRPs. Therefore, using only one CW per PDSCH/PUSCH assignment per UE is beneficial for NR, at least for up to rank-2 transmission, or up to rank-4 transmission. Else, two-CW per PDSCH/PUSCH assignment per UE can be used for higher ranks. Optionally, one CW per PDSCH/PUSCH assignment per UE can be used for all ranks.

In addition, periodic CSI (P-CSI) reporting in LTE is reported across multiple slots/subframes. This results in complex priority rules (due to dropping) and inter-subframe/slot dependencies which is unsuitable for TDD and LAA (since the availability of UL subframes/slots is conditional). This mechanism is susceptible to error propagations and stale CSI. The main reasons are: 1) PUCCH format 2 is too small to carry one-shot CSI reporting, 2) RI-dependent CQI payload (due to the use of maximum of 2 CWs), 3) RI-dependent PMI payload.

Yet another drawback of LTE design lies in separately encoding RI (and CRI) from CQI and PMI. This is necessary since the payload for CQI and PMI is rank-dependent. Since the payload for RI is small and RI needs to be protected more compared to CQI and PMI (to ensure correct decoding of CQI and PMI), RI is also mapped differently from CQI and PMI. But even with such a strong protection, there is no mechanism for the gNB to check whether RI (and CRI) decoding is successful or not (due to the absence of CRC).

Therefore, there is a need for a different design for CSI and its associated uplink control information (UCI) multiplexing schemes when a single codeword (CW) is mapped to all the L≥1 transmission layers. The present disclosure includes several components. Here, UCI includes reporting parameters associated with CSI acquisition, such as CQI (channel quality indicator), PMI (precoding matrix index), RI (rank indicator), and CRI (CSI-RS resource index/indicator). Other CSI parameters can also be included. Unless otherwise stated, this UCI does not include HARQ-ACK. In the present disclosure, this UCI can also be referred to as CSI-UCI for illustrative purposes.

The present disclosure includes the following components for enabling UCI generation and multiplexing as well as CSI reporting. A first component of the present disclosure pertains to CSI reporting unit in frequency domain. A second component pertains to CRI. A third component pertains to periodic and/or semi-persistent CSI reporting (P-CSI and/or SP-CSI, respectively). A fourth component pertains to aperiodic CSI reporting (A-CSI).

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include one or multiple slots) or one slot.

For the first component (that is, CSI reporting unit), the frequency resolution (reporting granularity) and span (reporting bandwidth) of CSI reporting can be defined in terms of frequency "subbands" and "CSI reporting band" (CRB), respectively. The term "CSI reporting band" is used for illustrative purposes. Different terms which represent a same set of functions can be used as well.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Optionally, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Optionally, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 5:
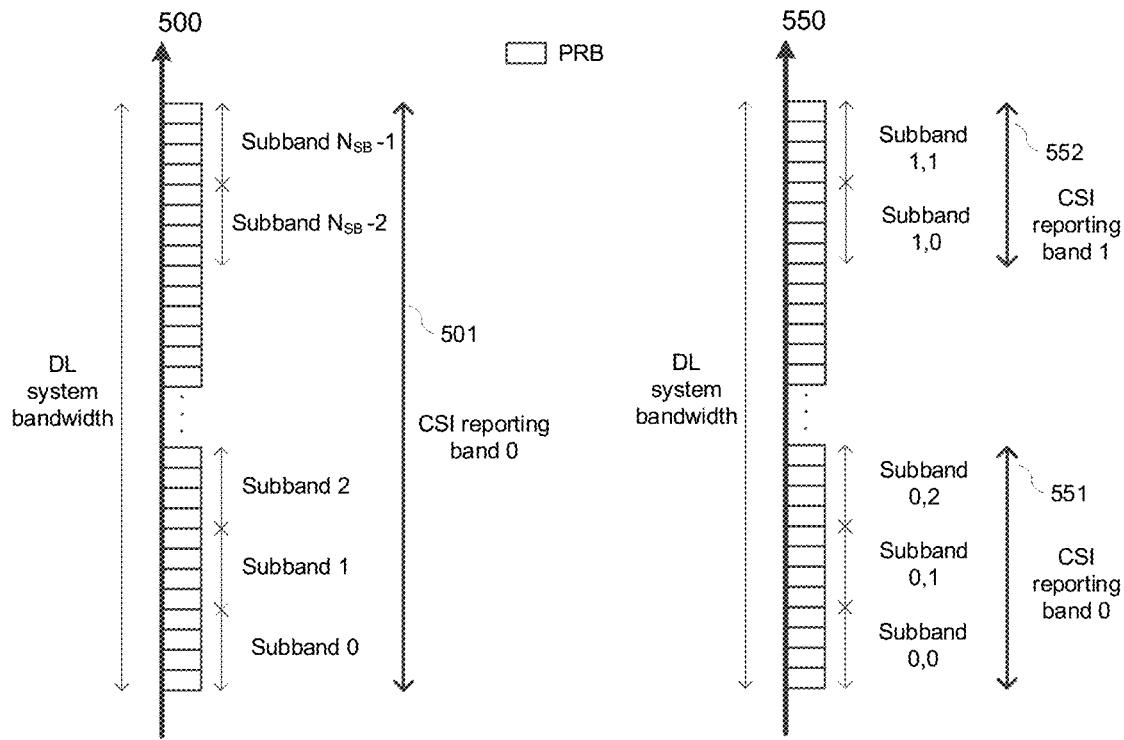
FIG. 5 illustrates several examples of CSI reporting band configuration according to embodiments of the present disclosure.

FIG. 5 illustrates several examples of CSI reporting band configuration. In these examples, one subband including 4 PRBs. In CSI reporting band configuration 500, a UE is configured with one CSI reporting band 0 (501) which spans the entire DL system bandwidth (including $N_{SB}$ subbands). In CSI reporting band configuration 550, a UE is configured with two CSI reporting bands. The first CSI reporting band 0 (551) including 3 subbands while the second CSI reporting band 1 (552) includes 2. For CSI reporting band configuration 550, a UE can be further configured or requested to report CSI for either reporting band (551 or 552) or both. The two reporting bands can be associated with one common/joint CSI reporting setting or two separate CSI reporting settings. Consequently, the two CSI reporting bands can be associated with different configurations (such as frequency granularity, periodic/semi-persistent/aperiodic) or different RS settings for CSI acquisition.

For the second component (that is, CRI or CSI-RS resource index reporting), a UE can be configured with K≥1 NZP (non-zero-power) CSI-RS resources within one CSI-RS or RS setting. When K>1, the UE can be configured with CRI reporting. CRI can be configured as "single" reporting, that is, one CRI for a CSI reporting band. Here, CRI is an indicator which recommends a selection of $K_A$ (≤K) out of K CSI-RS resources. CRI can be used for the purpose of CSI acquisition as well as beam management. CRI reporting can also be accompanied with at least one CSI-RSRP (CSI-RS received power, or, optionally termed "beam strength indicator" or "beam-RSRP") wherein each CSI-RSRP corresponds to at least one CSI-RS resource.

When a UE is configured with CRI reporting, some embodiments (Alt 1-1, 1-2, 2-1, 2-2, 3-1, and 3-2) on configuring CSI-RS resource subset for CRI reporting can be described in TABLE 1. Each of these embodiments can be utilized independently. Optionally, at least two of these embodiments can be used in combination with each other (such as either Alt 1-1 or 1-2 with either Alt 2-1 or 2-2). The option embodiments start with a UE configured with $K_{TOT}$ NZP CSI-RS resources via higher-layer (RRC) signaling in one RS setting.

TABLE 1

| CRI reporting configuration | | |
|---|---|---|
| Semi-static (RRC) configuration | MAC CE configuration | CRI reporting |
| $K_{TOT}$ resources are configured via RRC IE (RS setting) | K ≤ $K_{TOT}$ resources are activated (selected). Two options: Alt1-1: K is fixed in higher-layer RS setting, hence $\left\lceil \log_2\binom{K_{TOT}}{K} \right\rceil$-bit indicator via MAC CE or, optionally, L1 DL control signaling (via DCI). Alt 1-2: K can vary from 1 to $K_{TOT}$, hence $K_{TOT}$-bit bitmap via MAC CE or, optionally, L1 DL control signaling (DCI) can be used. | CRI indicates (recommended) selection of $K_A$ ≤ K resources. Two options: Alt 2-1: $K_A$ is configured in higher-layer RS setting or fixed in specification, hence $\lceil \log_2(K_A) \rceil$-bit CRI is used. Alt 2-2: $K_A$ can vary from 1 to K, hence K-bit bitmap CRI is used. Alt 2-3: $K_A$ is signaled dynamically via L1 DL control channel and included in an UL-related DCI (for example, as a $\lceil \log_2 K \rceil$-bit DCI field), hence $\lceil \log_2(K_A) \rceil$-bit CRI is used. This UL-related DCI can be a DCI used for CSI request (which include CRI reporting request). |

TABLE 1-continued

CRI reporting configuration

| Semi-static (RRC) configuration | MAC CE configuration | CRI reporting |
|---|---|---|
| $K_{TOT}$ resources are configured via RRC IE (RS setting) | (not used) $K = K_{TOT}$ | CRI indicates (recommended) selection of $K_A \leq K_{TOT}$ resources. Two options:<br>Alt 3-1: $K_A$ is configured in higher-layer RS setting or fixed in specification, hence $\lceil \log_2(K_A) \rceil$-bit CRI is used.<br>Alt 3-2: $K_A$ can vary from 1 to $K_{TOT}$, hence $K_{TOT}$-bit bitmap CRI is used.<br>Alt 3-3: $K_A$ is signaled dynamically via L1 DL control channel and included in an UL-related DCI (for example, as a $\lceil \log_2 K_{TOT} \rceil$-bit DCI field), hence $\lceil \log_2(K_A) \rceil$-bit CRI is used. This UL-related DCI can be a DCI used for CSI request (which include CRI reporting request). |

When a UE is configured with CRI reporting, a CRI report can be multiplexed with other CSI parameters such as CQI, PMI, and/or RI. Several embodiments pertaining to this issue can be described below.

In one embodiment (MUX-0), CRI is reported alone (separately from other CSI parameters) and measured from a different RS/CSI-RS setting (analogous to CSI-RS resource configuration in LTE) from that associated with CQI/PMI/RI. The RS setting used for CRI calculation/reporting can include K>1 NZP CSI-RS resources. The separate RS setting used for CQI/PMI/RI calculation/reporting can include only 1 NZP CSI-RS resource. In this case, CRI is reported in different subframes/slots from at least one of CQI, PMI, and RI.

In another embodiment (MUX-1), CRI is multiplexed (reported together) with CQI, PMI, and/or RI, and measured from a RS/CSI-RS setting associated with CQI/PMI/RI. This RS/CSI-RS setting can include K>1 NZP CSI-RS resources. In this case, CRI can be reported in same subframes/slots as CQI/PMI/RI. CQI/PMI/RI is calculated by measuring only one of the K>1 NZP CSI-RS resources—if CRI is configured with $K_A$=1. Optionally, if $K_A$>1, $K_A$ sets of CQI/PMI/RI are included in the CSI report.

Compared to MUX-1, MUX-0 allows UE to measure fewer number of CSI-RS resources ("beams") on average.

As previously mentioned, for each of $K_A$ CSI-RS resource indices indicated in CRI, at least one CSI-RSRP (or beam-RSRP) can also be reported. This CSI-RSRP can be treated as a type of CQI or CSI parameter. When a UE is configured with CSI-RSRP reporting in addition to CRI reporting, several embodiments can be described as follows. In one embodiment, $K_A$ CSI-RSRPs associated with $K_A$ CSI-RS resources ("beams") are reported in conjunction with CRI. In another embodiment, out of the $K_A$ CSI-RS resources indicated by CRI, CSI-RSRPs are given only for a subset of these resources (e.g., $M \leq K_A$ CSI-RS resources, wherein M can be either fixed or configured by the network or chosen by the UE). In another embodiment, only one CSI-RSRP representing all the $K_A$ CSI-RS resources ("beams"), e.g., average RSRP, minimum RSRP, or median RSRP across $K_A$ CSI-RS resources are reported in conjunction with CRI. In another embodiment, only two CSI-RSRPs representing maximum and minimum CSI-RSRPs, maximum and mean CSI-RSRPs, or mean and minimum CSI-RSRPs are reported in conjunction with CRI.

Figure 6:
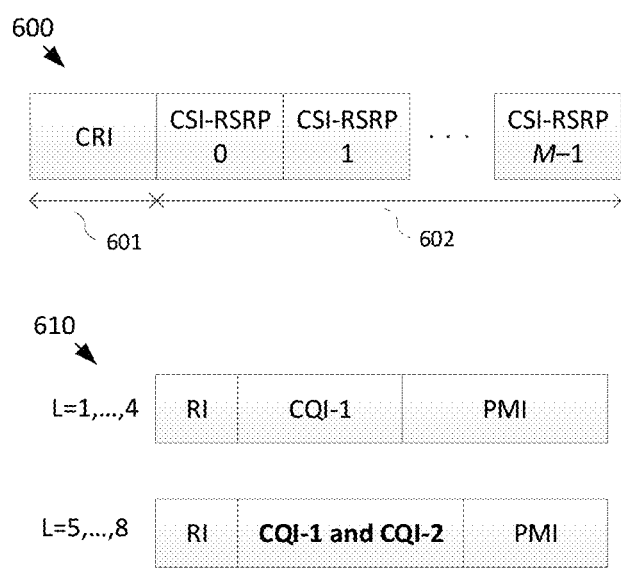
FIG. 6 illustrates an example for UCI codeword formation according to an embodiment of the present disclosure.
Figure 7:
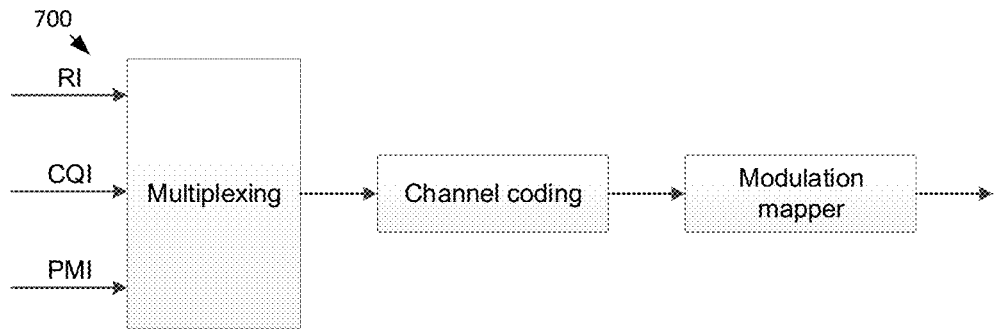
FIG. 7 illustrates an example for joint encoding of CSI parameters according to an embodiment of the present disclosure.
Figure 8:
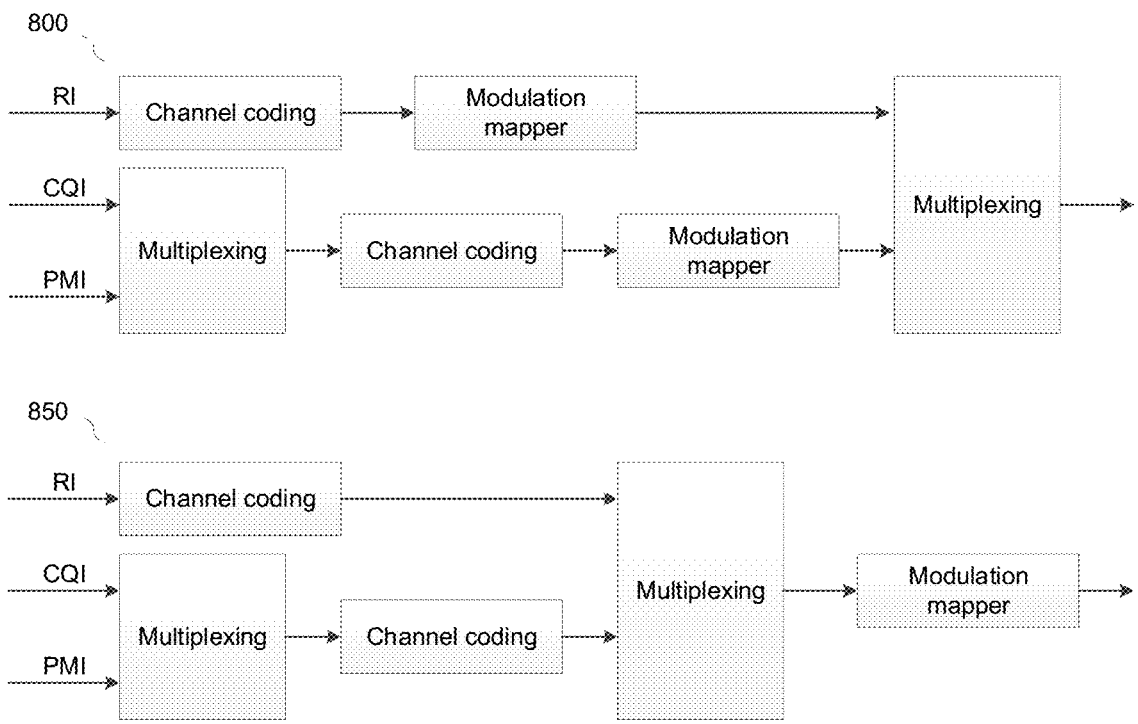
FIG. 8 illustrates an example for two-segment UCI encoding according to an embodiment of the present disclosure.
Figure 9A:
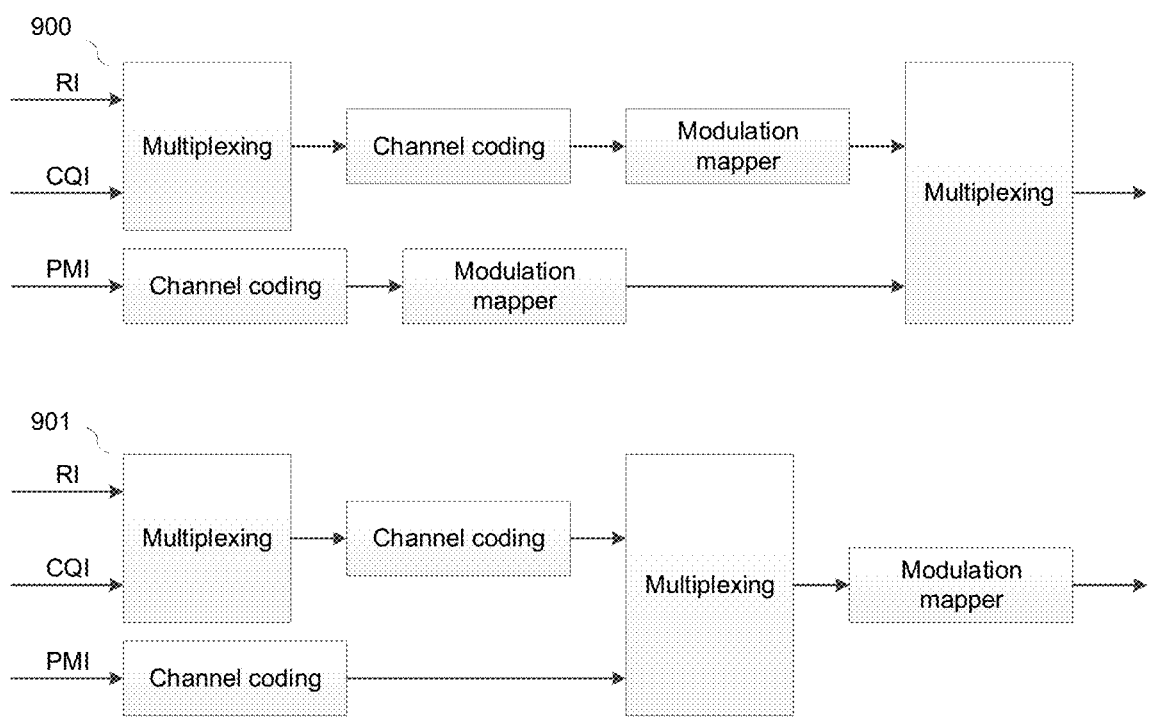
FIG. 9A illustrates an example for two-segment CSI encoding according to an embodiment of the present disclosure.
Figure 9B:
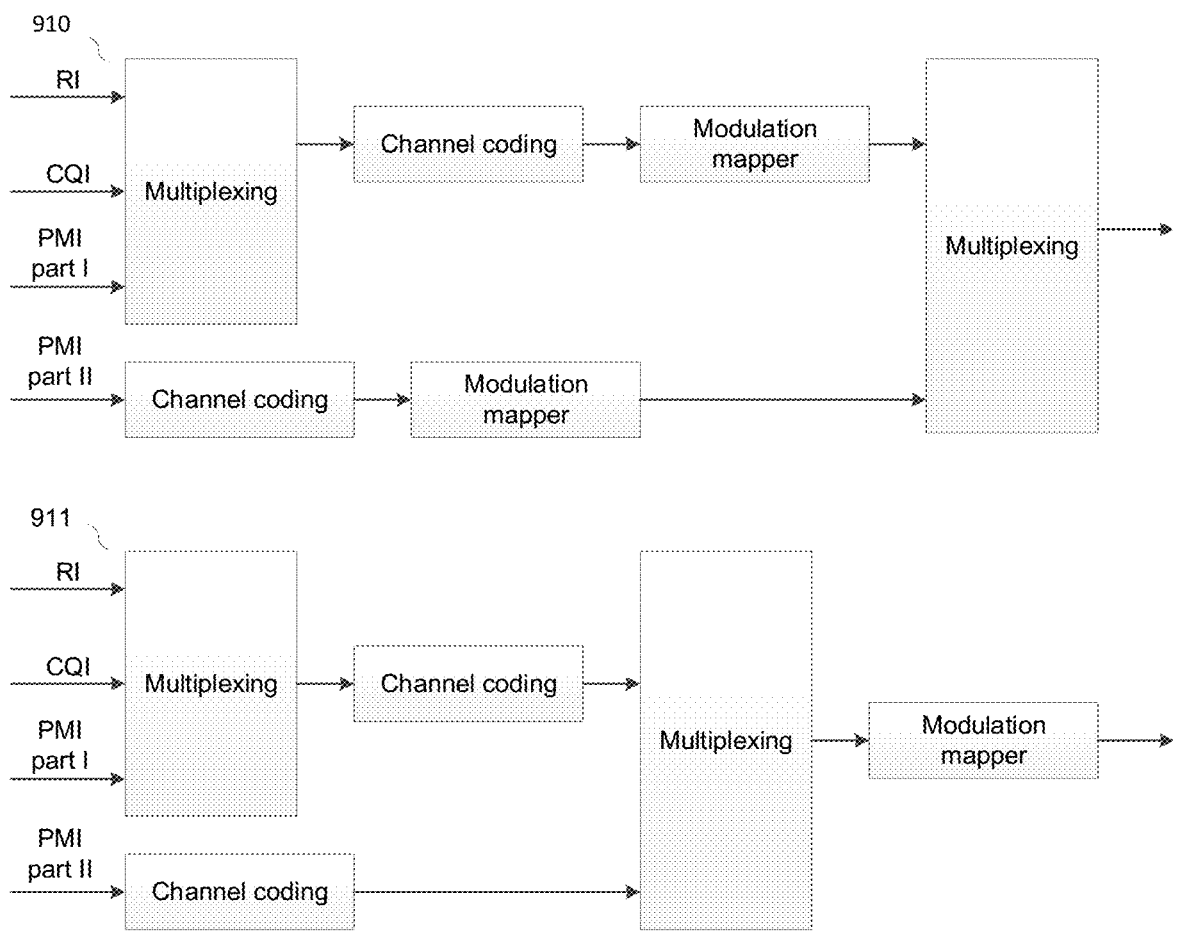
FIG. 9B illustrates an example for two-segment UCI encoding according to an embodiment of the present disclosure.
Figure 10:
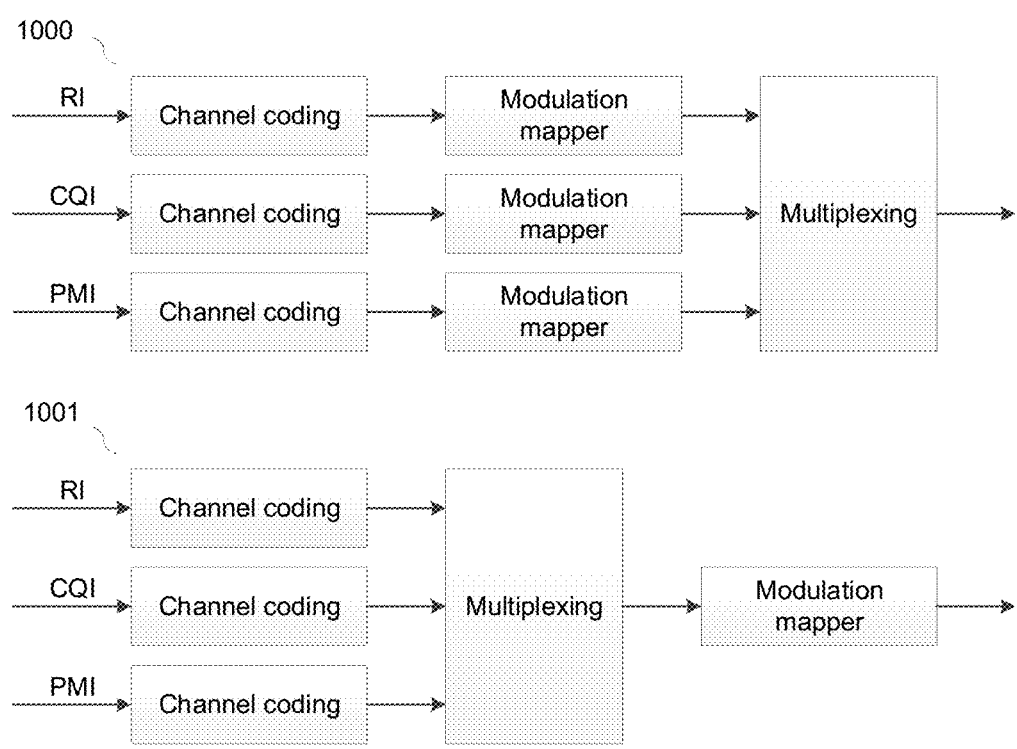
FIG. 10 illustrates an example for three-segment UCI encoding according to an embodiment of the present disclosure.

When a UE is configured to report CRI in conjunction with $M \leq K_A$ CSI-RSRPs associated with $M \leq K_A$ CSI-RS resources (where the value of M is either fixed or configured by the network), CRI and the M CSI-RSRPs can be concatenated to form a UCI codeword as illustrated in FIG. 6. This UCI codeword 600 is a bit sequence (which includes the bit sequence for CRI 601 and the bit sequences for the M CSI-RSRPs 602) $a_0, a_1, a_2, a_3, \ldots, a_{A-1}$ with $a_0$ corresponding to the first bit of the CRI field in the UCI codeword 600, $a_1$ corresponding to the second bit of the CRI field in the UCI codeword 600, and $a_{A-1}$ corresponding to the last bit of the last CSI-RSRP field (CSI-RSRP M−1) in the UCI codeword 600.

For the third component (that is, periodic and semi-persistent CSI), semi-persistent CSI (SP-CSI) is functionally the same as P-CSI except that SP-CSI requires an activation (whether via RRC signaling, MAC CE, or L1 DL control signaling) to start and a deactivation/release to stop.

In the present disclosure, P-CSI/SP-CSI is designed in such a way to avoid or minimize inter-subframe/slot dependencies. When single-CW layer mapping is utilized, one CQI representing all the layers in one CW can be used for a given reporting unit in frequency domain. Therefore, CQI payload (whether it is one CQI per CSI reporting band or subband CQI) is independent of the RI value. Furthermore, if P-CSI/SP-CSI is utilized for low-resolution feedback (e.g., link maintenance)—such as Type I CSI in NR with one CQI and one PMI for all the subbands in the CSI reporting band—the total CSI payload can be readily fitted within one UL reporting subframe/slot.

In one embodiment, P-CSI/SP-CSI includes a single CSI reporting per CSI reporting band which comprises a single RI representing all subbands in a configured CSI reporting band, a single CQI representing all the L layers (where RI indicates a recommended rank of L) and all the subbands in the configured CSI reporting band, and a single set of PMIs representing all the subbands in the configured CSI reporting band. The single PMI set can be composed of one precoder index parameter i, or two precoder indices (first and second PMI) $i_1$ and $i_2$, or even more precoder indices. Furthermore, the first PMI can be composed of one precoder index, two precoder indices $i_{1,1}$ and $i_{1,2}$ (e.g., for two-dimensional codebooks). The aforementioned CQI, PMI, and RI are reported in one UL subframe/slot. The UE calculates PMI conditioned on the reported RI in a same subframe/slot.

Likewise, the UE calculates CQI conditioned on the reported PMI and RI in a same subframe/slot.

In a variation of the above embodiment, a single CSI reporting parameter is used to represent joint hypotheses for PMI and RI. For illustrative purposes, this CSI reporting parameter can be termed R-PMI whose payload is $\lceil \log_2 (\Sigma_{r=1}^{R_{MAX}} H_r) \rceil$ bits, where $H_r$ is the number of precoder hypotheses associated with rank-r and $R_{MAX}$ is the maximum number of layers (value of rank) configured for the UE. An example of R-PMI is given in TABLE 2 where $\lceil \log_2 (\Sigma_{r=1}^{R_{MAX}} H_r) \rceil$ bits are used and the remaining $$\left( 2^{\lceil \log_2 (\Sigma_{r=1}^{R_{MAX}} H_r) \rceil} - \left( \sum_{r=1}^{R_{MAX}} H_r \right) \right)$$

hypotheses, if any, are reserved, possibly for other/future usage. The single PMI set can be composed of one precoder index parameter i, or two precoder indices (first and second PMI) $i_1$ and $i_2$, or even more precoder indices. Furthermore, the first PMI can be composed of one precoder index, two precoder indices $i_{1,1}$ and $i_{1,2}$ (e.g., for two-dimensional codebooks). Therefore, a PMI hypothesis in TABLE 2 can represent a hypothesis for i, $(i_1, i_2)$, or $(i_{11}, i_{12}, i_2)$. This approach of using joint hypotheses allows a potentially more efficient manner in minimizing P-CSI/SP-CSI payload especially when the number of PMI hypotheses varies across different values of RI (which is usually the case).

TABLE 2

Example of R-PMI definition

| R-PMI hypothesis | RI hypothesis | PMI hypothesis |
| --- | --- | --- |
| 0 | RI = 1 | Precoder 0 for RI = 1 |
| 1 | RI = 1 | Precoder 1 for RI = 1 |
| ... | ... | ... |
| $H_1 - 1$ | RI = 1 | Precoder $H_1 - 1$ for RI = 1 |
| ... | ... | ... |
| $(\Sigma_{r=1}^{R_{MAX}-1} H_r)$ | RI = $R_{MAX}$ | Precoder 0 for RI = $R_{MAX}$ |
| $(\Sigma_{r=1}^{R_{MAX}-1} H_r) + 1$ | RI = $R_{MAX}$ | Precoder 1 for RI = $R_{MAX}$ |
| ... | ... | ... |
| $(\Sigma_{r=1}^{R_{MAX}} H_r)$ | RI = $R_{MAX}$ | Precoder $H_{R_{MAX}} - 1$ for RI = $R_{MAX}$ |
| ... | | Reserved |
| $2^{\lceil \log_2 (\Sigma_{r=1}^{R_{MAX}} H_r) \rceil} - 1$ | | |

In a variation of the above embodiment, when 2-CW layer mapping is utilized for higher ranks (such as rank 5-8, or, optionally, rank 3-8) in addition to 1-CW layer mapping for lower ranks (such as rank 1-4, or, optionally, rank 1-2, respectively), one CQI representing all the layers in one CW or two CWs can be used for a given reporting unit in frequency domain. Therefore, CQI payload (whether it is one CQI per CSI reporting band or subband CQI) can still be independent of the RI value regardless of the number of CWs. In this case, a single CSI reporting parameter, as described above in the previous paragraph, is used to represent joint hypotheses for PMI and RI. For P-CSI/SP-CSI, the CSI report includes a single CSI reporting per CSI reporting band which comprises a single RI representing all subbands in a configured CSI reporting band, a single CQI representing all the L layers (where RI indicates a recommended rank of L) and all the subbands in the configured CSI reporting band, and a single set of PMIs representing all the subbands in the configured CSI reporting band.

In another embodiment, when a UE is configured with CRI reporting, two options exist regardless whether CRI and CQI/PMI/RI are calculated using a same CSI-RS resource (MUX-1 in component 2) or two different CSI-RS resources (MUX-0 in component 2). In the first option (Alt 0), CRI can be reported separately (for example, in a different set of subframes/slots) from CQI/PMI/RI. This option is more natural for MUX-0. In the second option (Alt 1), CRI is reported together with CQI/PMI/RI (in a same set of subframes/slots). As previously mentioned for component 2, for each of $K_A$ CSI-RS resource indices indicated in CRI, at least one CSI-RSRP (or beam-RSRP) can also be reported.

In another embodiment when a UE is configured with DL or UL assignment which indicates 2 CWs, the total payload for this case (including RI, PMI, and CQI) can be kept the same. Here the number of bits allocated for reporting RI remains the same. However, since one CQI is used per CW, only one field of CQI is included when L≤4 (CQI-1). However, as the number of CWs is two, two CQI fields can be included (CQI-1 and CQI-2). The second CQI CQI-2 can be reported as a full CQI or a differential CQI relative to the first CQI CQI-1. An example is illustrated in diagram 610 of FIG. 6. To maintain the same payload for P-CSI, the PMI reporting for lower ranks can be decreased (since the codebooks associated with higher ranks tend to be of smaller size). Therefore, the number of bits for CQI-1 plus PMI when RI≤4 is the same as the number of bits for CQI-1 plus CQI-2 plus PMI when RI>4. This is beneficial since precoding tends to perform better for lower ranks.

When a UE is configured to report CSI for more than one (M>1) DL component carriers (CCs) in case of carrier aggregation (CA), the bit sequences associated CSI-UCIs for M different DL CCs can be concatenated ($CC_0|CC_1| \ldots |CC_{M-1}$) into one UCI codeword to be encoded with a channel coding block.

Each of the embodiments described for Component 3 applies (in general) for CSI reporting with reasonably small payload—either periodic, semi-persistent, or aperiodic; either wideband/partial-band (one report per a configured CSI reporting band) or subband (one report per subband within a configured CSI reporting band). The associated CSI-UCI can be transmitted via either a separate UL control channel from PUSCH (analogous to PUCCH for LTE) or PUSCH itself by allocating a small number of PRBs or a fraction of PRB (a set of sub-carriers within one PRB and/or a set of OFDM symbols within one slot). The second option (transmission on PUSCH) can be done whether CSI-UCI is multiplexed with UL-SCH data or not.

For the fourth component (that is, aperiodic CSI), aperiodic CSI (A-CSI) accommodates reporting with different frequency granularities (one report for all the $N_{SB}$ subbands in a configured CSI reporting band, or one report per subband in a configured CSI reporting band) for CQI and PMI. RI and CRI (and its associated CSI-RSRP(s)), however, are only reported with one frequency granularity (one report for all the $N_{SB}$ subbands in a configured CSI reporting band).

In addition, if single-CW layer mapping is used, CQI payload is independent of RI value. PMI payload, however, can be dependent on RI value. For example, for Type I (normal) CSI with lower spatial resolution, PMI payload can be made RI-independent or less dependent on RI value. For Type II (enhanced) CSI with higher spatial resolution, PMI payload can be RI-dependent (for instance, PMI payload can be proportional to RI value with per-layer quantization/feedback). The following embodiments, however, can be utilized whether single-CW layer mapping is used or not.

For example, they are also applicable for a layer mapping where the maximum of 2 CWs are used (such as that used for LTE).

In one embodiment of the present disclosure (Scheme 0), all the reported CSI parameters are jointly encoded into one codeword. This codeword, after code block (CB) CRC insertion (or potentially CB segmentation), is an input to a channel coding block. This embodiment is illustrated in diagram 700 of FIG. 7 when CQI, PMI, and RI are reported. An example use case for this embodiment is when only one PMI is reported for the entire CSI reporting band (CRB), i.e., "wideband" or "partial-band" PMI reporting (either for Type I CSI, Type II CSI, or both types). In this case, PMI and RI can be jointly indicated as discussed in Component 3. Therefore, CQI can be jointly encoded with PMI and RI. Scheme 0 can also be used when a UE is configured with CRI reporting or CRI reporting in conjunction with at least one CSI-RSRP or, in general, a quality metric for beam management (including CQI).

In another embodiment of the present disclosure (Scheme 1), when a UE is configured with RI reporting, RI is separately encoded (codeword segment 1) while other reported CSI parameters are jointly encoded into one codeword segment (codeword segment 2). This codeword segment 2, after code block (CB) CRC insertion (or potentially CB segmentation), is an input to a channel coding block. Codeword segment 1 is an input to another channel coding block. Since codeword segment 1 is short, a CRC can either be added or not. This embodiment is illustrated in diagram 800 (where modulation mapper is applied on each segment before multiplexing) and diagram 850 (where modulation mapper is applied after multiplexing the two segments) of FIG. 8.

In another embodiment of the present disclosure (Scheme 2), when a UE is configured with RI reporting, RI and at least one other CSI parameter whose payload is independent of the value of RI are jointly encoded to form a codeword segment 1. This codeword segment 1, after code block (CB) CRC insertion (or potentially CB segmentation), is an input to a channel coding block. Other remaining CSI parameters are jointly encoded to form another codeword segment 2. This codeword segment 2, after code block (CB) CRC insertion (or potentially CB segmentation), is an input to a channel coding block.

Compared to Scheme 1 and Scheme 3 (described later) wherein RI is also separately encoded from at least one other CSI parameter, Scheme 2 allows RI (whose payload is typically small) to be jointly encoded with at least one other CSI parameter such as the payload of codeword segment 1 is large enough for justifying CRC insertion after channel coding. With CRC, the gNB, upon receiving CSI-UCI transmission from the UE, can perform error detection to reliably check whether the CSI-UCI is successfully decoded or not. Erroneous detection of RI can be catastrophic as explained before.

In a variation of the previous embodiment (Scheme 2) of the present disclosure (Scheme 2A), when a UE is configured with RI reporting, RI and CQI are jointly encoded to form a codeword segment 1. This codeword segment 1, after code block (CB) CRC insertion (or potentially CB segmentation), is an input to a channel coding block. PMI (all parameters pertaining to PMI) is jointly encoded to form another codeword segment 2. This codeword segment 2, after code block (CB) CRC insertion (or potentially CB segmentation), is an input to a channel coding block. This embodiment is illustrated in diagram 900 (where modulation mapper is applied on each segment before multiplexing) and diagram 901 (where modulation mapper is applied after multiplexing the two segments) of FIG. 9A. An example use case for this embodiment is when Type II CSI is reported with one PMI report for all the subbands in the CSI reporting band (i.e., either "wideband" or "partial-band" PMI). In this case, the PMI payload, albeit one report, is still reasonably large and can be encoded separately from CQI and RI (as codeword segment 2). Another example use case for this embodiment is when subband PMI is reported (regardless of Type I/II, single- or dual-stage PMI).

In a variation of the previous embodiment (Scheme 2) of the present disclosure (Scheme 2B), the CSI parameters included in PMI are partitioned into two parts: PMI part I and PMI part II. When a UE is configured with RI reporting, RI, CQI, and PMI part I are jointly encoded to form a codeword segment 1. This codeword segment 1, after code block (CB) CRC insertion (or potentially CB segmentation), is an input to a channel coding block. PMI part II is jointly encoded to form another codeword segment 2. This codeword segment 2, after code block (CB) CRC insertion (or potentially CB segmentation), is an input to a channel coding block. This embodiment is illustrated in diagram 910 (where modulation mapper is applied on each segment before multiplexing) and diagram 911 (where modulation mapper is applied after multiplexing the two segments) of FIG. 9B.

Some sub-embodiments of Scheme 2B can be described as follows.

In a first sub-embodiment of Scheme 2B, PMI part I comprises the PMI reporting parameters associated with the first layer whereas PMI part II comprises PMI reporting parameters associated with the second to the last layer (with RI=L, this layer corresponds to the $L^{th}$). This embodiment is relevant especially for Type II CSI when PMI can be defined per layer.

In a second sub-embodiment of Scheme 2B, PMI part I comprises the PMI reporting parameters associated with the first or first stage (wideband) PMI parameter $i_1$, or ($i_{11}$, $i_{12}$) which is common for all the layers, whereas PMI part II comprises PMI reporting parameters associated with the second or second stage PMI parameter $i_2$ (which is RI-dependent). This embodiment is relevant for both Type I and Type II CSI when PMI payload depends on the value of RI. In one example use case of this sub-embodiment where PMI frequency granularity is per subband, RI and the first or first stage (wideband) PMI parameter $i_1$, or ($i_{11}$, $i_{12}$)—one $i_1$ repo per CSI reporting band regardless of PMI frequency granularity—can be jointly indicated as described in Component 3. The second or second stage PMI parameter $i_2$ (which is RI-dependent) can be reported per subband.

In a third sub-embodiment of Scheme 2B, PMI part I comprises the PMI reporting parameters associated with the first or first stage (wideband) PMI parameter $i_1$, or ($i_{11}$, $i_{12}$) which is common for all the layers, as well as the second or second stage PMI parameter $i_2$ associated with the first layer. PMI part II comprises PMI reporting parameters associated with the second or second stage PMI parameter $i_2$ associated with the second to the last layer (with RI=L, this layer corresponds to the $L^{th}$). This embodiment is relevant especially for Type II CSI when PMI can be defined per layer.

For Scheme 2/2A/2B, it is expected that each of the two codeword segments is sufficiently large. Hence, a polar code or a TBCC can be used. In regard of CRC insertion for the two codeword segments, a $L_{CRC}$-bit CRC can be inserted into each of the two codeword segments (which results in two separate CRC insertions) before channel coding. If the size of a segment is sufficiently large that code block/CB segmentation needs to be performed, a $L_{CRC}$-bit CRC can be inserted into each of the CBs. Optionally, only one $L_{CRC}$-bit CRC can be used for both codeword segments (hence a joint CRC for segments 1 and 2). In this case, CRC insertion is performed prior to segmenting the CSI-UCI codeword into two. Likewise, if the size of a CSI-UCI codeword is sufficiently large that code block/CB segmentation needs to be performed, a $L_{CRC}$-bit CRC can be inserted into each of the CBs.

For Scheme 2/2A/2B, a gNB can first decode codeword segment 1 (which includes RI) before segment 2 (whose size is RI-dependent). Based on the decoded RI value, the payload size of segment 2 is known. In addition, if at least one $L_{CRC}$-bit CRC is inserted into codeword segment 1, the gNB can check whether segment 1 is successfully decoded or not. This increases the reliability of the gNB inference of the payload size of segment 2.

For Scheme 2/2A/2B, when a UE is configured with CRI reporting (with or without CSI-RSRP), CRI or CRI+CSI-RSRP can be included in codeword segment 1, that is, jointly encoded with RI and at least one other CSI parameter whose payload size is independent of RI value.

In another embodiment of the present disclosure (Scheme 3), when a UE is configured with RI reporting, RI is encoded to form a codeword segment 1, CQI is encoded to form a codeword segment 2, and PMI is encoded to form a codeword segment 3. Each of the three codeword segments, potentially after code block (CB) CRC insertion and/or CB segmentation, is an input to a channel coding block. This embodiment is illustrated in diagram 1000 (where modulation mapper is applied on each segment before multiplexing) and diagram 1001 (where modulation mapper is applied after multiplexing the two segments) of FIG. 10. Channel coding and CRC insertion for Scheme 3 follow those for Scheme 2/2A/2B by extension the descriptions for 3 codeword segments.

In a variation of any of the above embodiments 0/1/2/2A/2B/3, when 2-CW layer mapping is utilized for higher ranks (such as rank 5-8, or, optionally, rank 3-8) in addition to 1-CW layer mapping for lower ranks (such as rank 1-4, or, optionally, rank 1-2, respectively), one CQI representing all the layers in one CW or two CWs can be used for a given reporting unit in frequency domain. Therefore, CQI payload (whether it is one CQI per CSI reporting band or subband CQI) can still be independent of the RI value regardless of the number of CWs. In this case, a single CSI reporting parameter, as described above in the previous paragraph, is used to represent joint hypotheses for PMI and RI. For P-CSI/SP-CSI, the CSI report includes a single CSI reporting per CSI reporting band which comprises a single RI representing all subbands in a configured CSI reporting band, a single CQI representing all the L layers (where RI indicates a recommended rank of L) and all the subbands in the configured CSI reporting band, and a single set of PMIs representing all the subbands in the configured CSI reporting band.

Another embodiment of the present disclosure (Scheme 4) can be used when 2-CW layer mapping is utilized for higher ranks (when RI>x, such as RI>4, or, optionally, RI>2) in addition to 1-CW layer mapping for lower ranks (when RI≤x, such as RI≤4, or, optionally, RI≤2, respectively). In this case, depending on the value of RI, the number of CWs can change between 1 and 2, different CQIs can be used for the two different CWs when the RI value implies the use of 2 CWs (that is, CQI-1 for the first CW and, when RI>x, CQI-2 for the second CW). In other words, when RI≤x (such as RI≤4, or, optionally, RI≤2), one CQI (CQI-1) representing one CW is reported. Else, RI>x (such as RI>4, or, optionally, RI>2), two CQIs (CQI-1 and CQI-2) representing two CWs are reported. Two sub-embodiments of Scheme 4 are illustrated in FIGS. 11A and 11B.

Figure 11A:
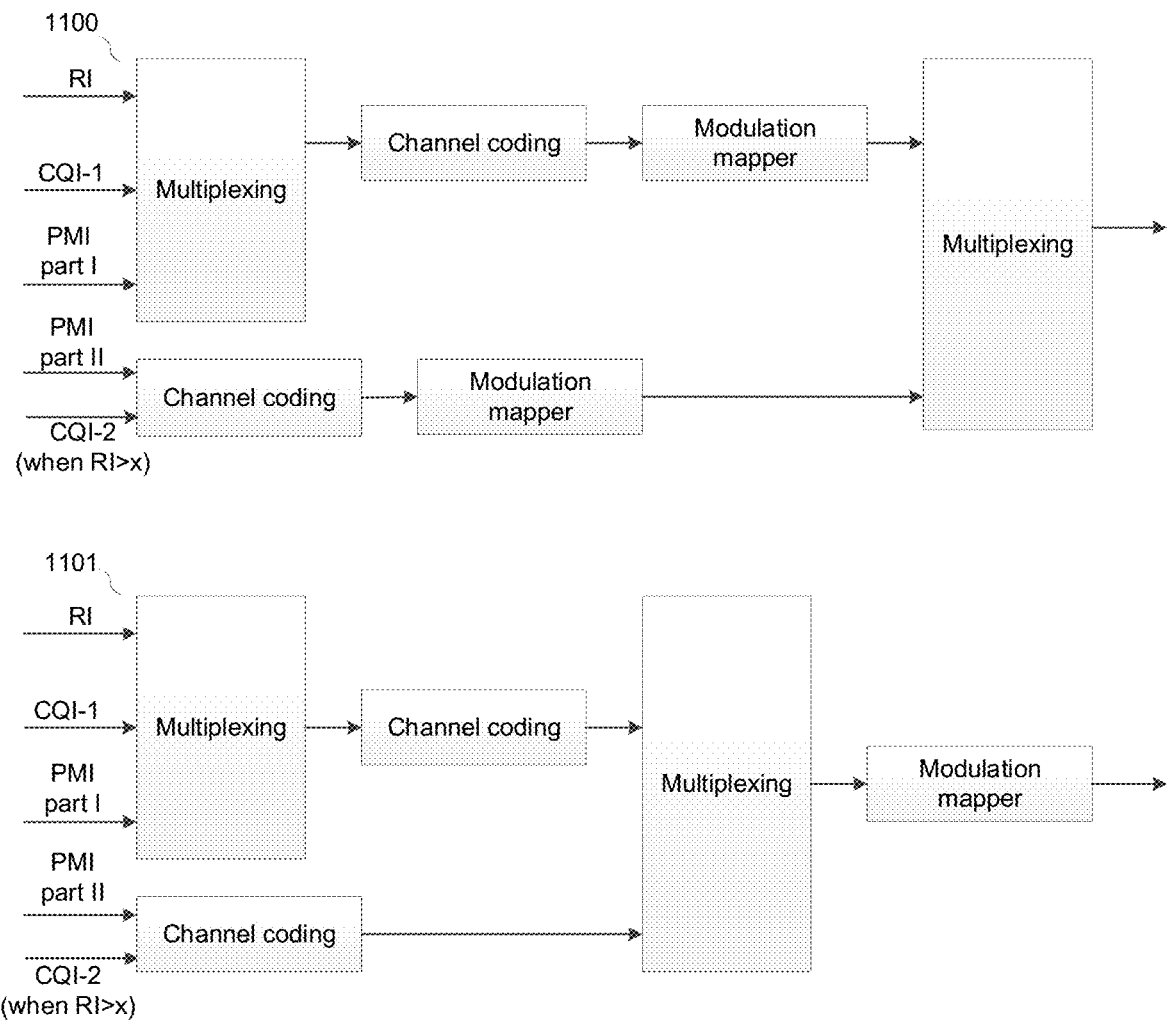
FIGS. 11A-11G illustrate examples for two-segment UCI encoding according to embodiments of the present disclosure.

In the sub-embodiment illustrated in FIG. 11A, the CSI parameters included in PMI are partitioned into two parts: PMI part I and PMI part II. Therefore, the descriptions of different examples for PMI part I and part II from Scheme 2/2A/2B can apply. When a UE is configured with RI reporting, RI, CQI-1, and PMI part I are jointly encoded to form a codeword segment 1. This codeword segment 1, after code block (CB) CRC insertion (or potentially CB segmentation), is an input to a channel coding block. When RI>x (see above), PMI part II is jointly encoded with CQI-2 to form another codeword segment 2. Otherwise, when RI≤x, PMI part II is encoded (by itself) to form another codeword segment 2. This codeword segment 2, after code block (CB) CRC insertion (or potentially CB segmentation), is an input to a channel coding block. This embodiment is illustrated in diagram 1100 (where modulation mapper is applied on each segment before multiplexing) and diagram 1101 (where modulation mapper is applied after multiplexing the two segments) of FIG. 11A.

Figure 11B:
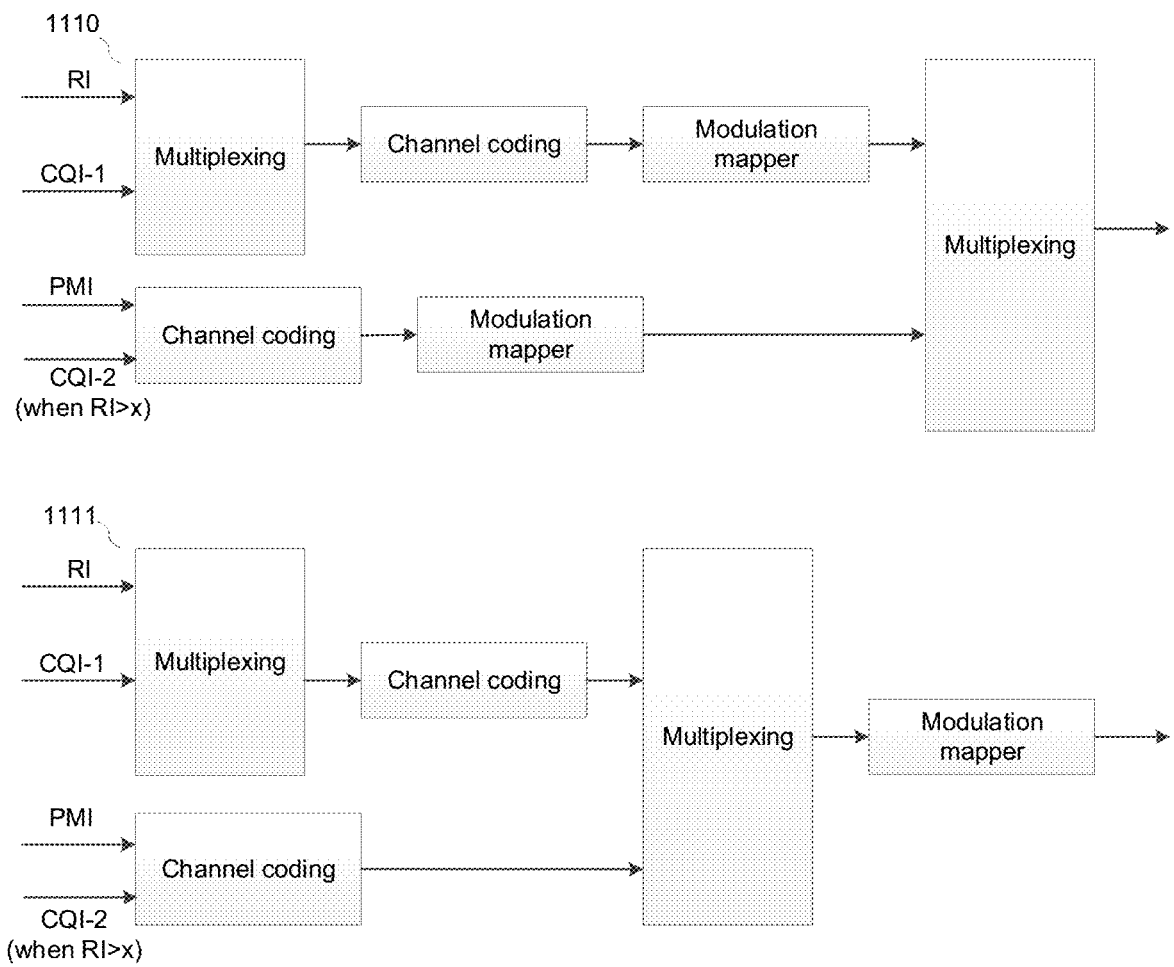

In the sub-embodiment illustrated in FIG. 11B, the CSI parameters included in PMI are encoded together. When a UE is configured with RI reporting, RI and CQI-1 are jointly encoded to form a codeword segment 1. This codeword segment 1, after code block (CB) CRC insertion (or potentially CB segmentation), is an input to a channel coding block. When RI>x (see above), PMI is jointly encoded with CQI-2 to form another codeword segment 2. Otherwise, when RI≤x, PMI is encoded (by itself) to form another codeword segment 2. This codeword segment 2, after code block (CB) CRC insertion (or potentially CB segmentation), is an input to a channel coding block. This embodiment is illustrated in diagram 1110 (where modulation mapper is applied on each segment before multiplexing) and diagram 1111 (where modulation mapper is applied after multiplexing the two segments) of FIG. 11B.

In another sub-embodiment which is applicable to Type II with rank 1-2, beam amplitude/power coefficients can be reported separately in addition to the first PMI (PMI part 1) $i_1$. Based on the value of such (wideband) beam amplitude/power coefficients, the subband reporting payload can be adjusted. In one example, when some of the beam amplitude/combining coefficients are zero, the total subband reporting payload can be reduced by not reporting, for instance, the subband part of the amplitude/power coefficients (when the UE is configured to report subband beam amplitude/power coefficients in addition to wideband beam amplitude/power coefficients). Here, the value of L can be configured via higher layer signaling or MAC CE. However, when some of the wideband amplitude/power coefficients can be zero, the total reported CSI varies dynamically.

Therefore, the first segment can carry CSI parameters which are not affected by RI and/or the number of non-zero wideband amplitude/power coefficients, such as the wideband amplitude/power coefficients for the first layer (Amp-1, which includes the indicator for the strongest/leading coefficient for the first layer), along with RI (maximum of 2), CQI (only one CQI is reported since the maximum rank is 2), and the first PMI ($i_1$ which is reported as a wideband CSI parameter, denoted as PMI part 1). The second segment includes the second PMI ($i_2$ which can be reported per subband and per layer, denoted as PMI part 2), the wideband amplitude/power coefficients for the second layer (Wideband Amp-2, if RI=2, which includes the indicator for the strongest/leading coefficient for the second layer), and the subband part of the amplitude/power coefficients (Subband Amp-1 for the first layer and, if RI=2, Subband Amp-2 for the second layer, when the UE is configured to report subband beam amplitude/power coefficients in addition to wideband beam amplitude/power coefficients). This is illustrated in diagram 1120 of FIG. 11C.

Figure 11C:
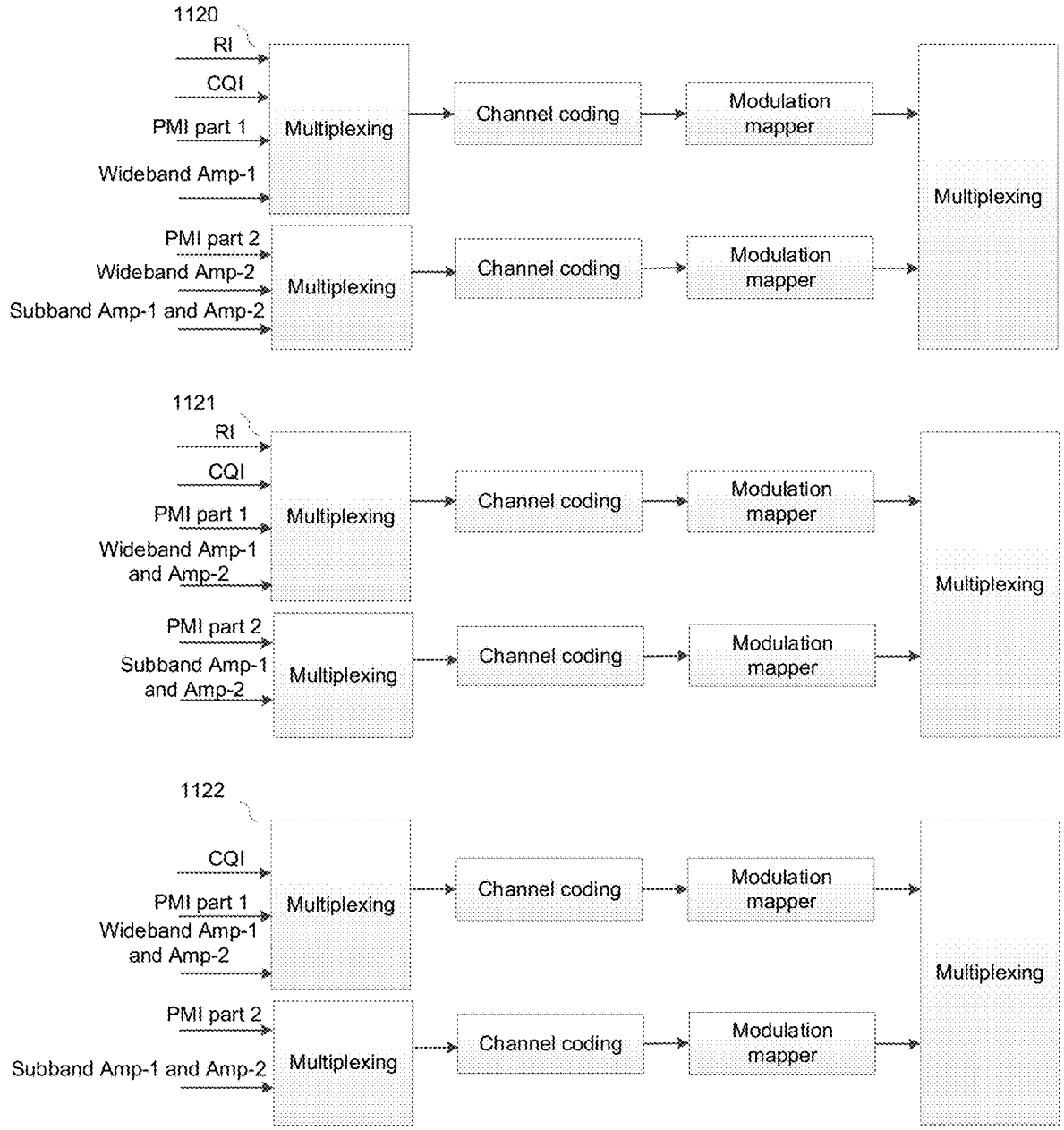

Optionally, the wideband amplitude/power coefficients for the second layer (Wideband Amp-2, which includes the indicator for the strongest/leading coefficient for the second layer) can be included in the first segment as illustrated in diagram 1121 of FIG. 11C (since the payload of this wideband reporting). In this case, since the payload for the first segment is to be kept the same regardless of the value of RI (1 or 2), the payload of the first segment is determined or provisioned assuming RI=2.

The embodiments illustrated in diagrams 1120 and 1121 can be extended when Type I is supported for rank 1, 2, 3, and 4. The extension can be inferred by those skilled in the art.

In another sub-embodiment illustrated in diagram 1122 (a variation of the previous embodiment illustrated in diagram 1121) which is applicable to Type II with rank 1-2, beam amplitude/power coefficients can be reported separately in addition to the first PMI (PMI part 1) $i_1$. Based on the value of such (wideband) beam amplitude/power coefficients, the subband reporting payload can be adjusted. In one example, when some of the beam amplitude/combining coefficients are zero, the total subband reporting payload can be reduced by not reporting, for instance, the subband part of the amplitude/power coefficients (when the UE is configured to report subband beam amplitude/power coefficients in addition to wideband beam amplitude/power coefficients). Here, the value of L can be configured via higher layer signaling or MAC CE. However, when some of the wideband amplitude/power coefficients can be zero, the total reported CSI varies dynamically.

In this example sub-embodiment, the wideband amplitude/power coefficients associated with both the first and the second layer (Wideband Amp-1, which includes the indicator for the strongest/leading coefficient for the first layer, Wideband Amp-2, which includes the indicator for the strongest/leading coefficient for the second layer) can be included in the first segment as illustrated in diagram 1122 of FIG. 11C (since the payload of this wideband reporting). Here both sets of coefficients are included regardless of the value of RI. However, RI is not included or reported—but instead can be inferred from the values of Wideband Amp-1 and/or Wideband Amp-2. For example, if the 2L amplitude coefficients corresponding to Wideband Amp-2 are zero, it can be assumed that RI=1. Or similarly if the 2L amplitude coefficients corresponding to Wideband Amp-1 are zero, it can be assumed that RI=1.

In this case, since the payload for the first segment is to be kept the same regardless of the value of RI (1 or 2), the payload of the first segment is determined or provisioned assuming RI=2.

Figure 11D:
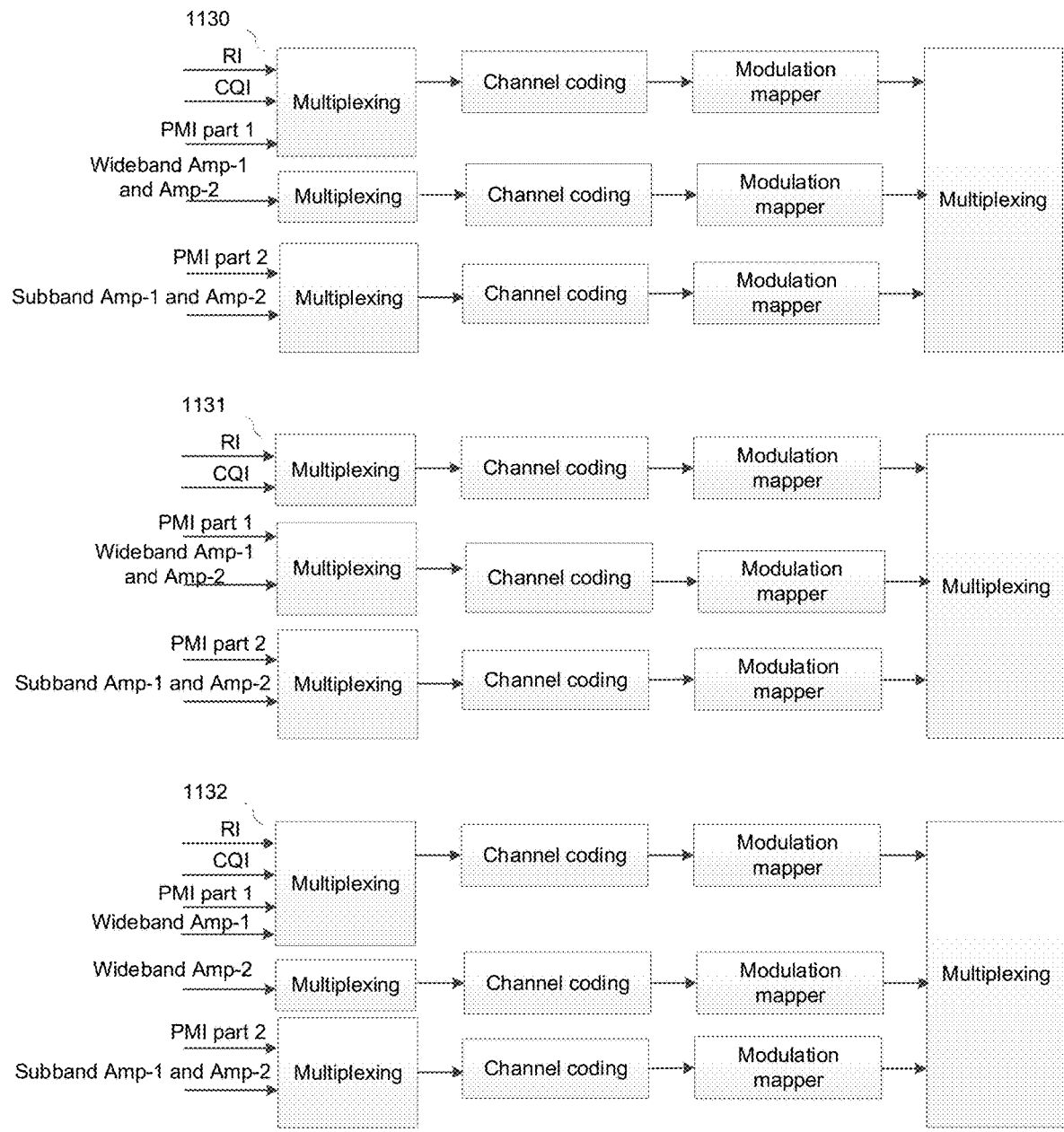

In another sub-embodiment illustrated in diagram 1130 in FIG. 11D (a variation of the previous embodiment illustrated in diagram 1121 in FIG. 11C) which is applicable to Type II with rank 1-2, three-part UCI multiplexing is used wherein CQI, RI, and PMI part 1 are multiplexed and encoded together in part 1, but separately from Wideband Amp-1 and/or Wideband Amp-2 (Wideband Amp-2 is included only if RI=2, otherwise only Wideband Amp-1 is included) in part 2. The other parameters (PMI part 2, Subband Amp-1, and, if RI=2, Subband Amp-2) are multiplexed in part 3, which is separately encoded from Part 1 and Part 2, Based on the value of such (wideband) beam amplitude/power coefficients, the subband reporting payload can be adjusted. In one example, when some of the beam amplitude/combining coefficients are zero, the total subband reporting payload can be reduced by not reporting, for instance, the subband part of the amplitude/power coefficients (when the UE is configured to report subband beam amplitude/power coefficients in addition to wideband beam amplitude/power coefficients). Here, the value of L can be configured via higher layer signaling or MAC CE. However, when some of the wideband amplitude/power coefficients can be zero, the total reported CSI varies dynamically.

In this example sub-embodiment, the wideband amplitude/power coefficients associated with both the first and the second layer (Wideband Amp-1, which includes the indicator for the strongest/leading coefficient for the first layer, Wideband Amp-2, which includes the indicator for the strongest/leading coefficient for the second layer) can be included in the second segment (part 2) as illustrated in diagram 1130 of FIG. 11D (since the payload of this wideband reporting varies with reported RI).

Optionally, as illustrated in diagram 1131 of FIG. 11D, part 1 included RI and CQI whereas part 2 includes PMI part 1, Wideband Amp-1, and Wideband Amp-2 (Wideband Amp-2 is included only if RI=2, otherwise only PMI part 1 and Wideband Amp-1 are included) in part 2.

In another sub-embodiment illustrated in diagram 1132 in FIG. 11D (a variation of the previous embodiment illustrated in diagram 1121 in FIG. 11C) which is applicable to Type II with rank 1-2, three-part UCI multiplexing is used wherein CQI, RI, PMI part 1, and Wideband Amp-1 are multiplexed and encoded together in part 1, and Wideband Amp-2 (Wideband Amp-2 is reported only if RI=2) in part 2. The other parameters (PMI part 2, Subband Amp-1, and, if RI=2, Subband Amp-2) are multiplexed in part 3, which is separately encoded from part 1 and part 2, Based on the value of such (wideband) beam amplitude/power coefficients, the subband reporting payload can be adjusted. In one example, when some of the beam amplitude/combining coefficients are zero, the total subband reporting payload can be reduced by not reporting, for instance, the subband part of the amplitude/power coefficients (when the UE is configured to report subband beam amplitude/power coefficients in addition to wideband beam amplitude/power coefficients). Here, the value of L can be configured via higher layer signaling or MAC CE. However, when some of the wideband amplitude/power coefficients can be zero, the total reported CSI varies dynamically.

In this example sub-embodiment, the wideband amplitude/power coefficients associated with the first layer (Wideband Amp-1, which includes the indicator for the strongest/leading coefficient for the first layer), is included in the first segment (part 1). The payload of part 1 reporting is hence fixed. The wideband amplitude/power coefficients associated with the second layer (Wideband Amp-2, which includes the indicator for the strongest/leading coefficient for the second layer) is included in the second segment (part 2) as illustrated in diagram 1132 of FIG. 11D. Since the payload of this wideband reporting (part 2) varies depending on the reported RI. If RI=1, part 2 is not reported, and if RI=2, the Wideband amp-2 for the second layer (included in part 2) is reported. Part 3, on the other hand, is reported.

Figure 11E:
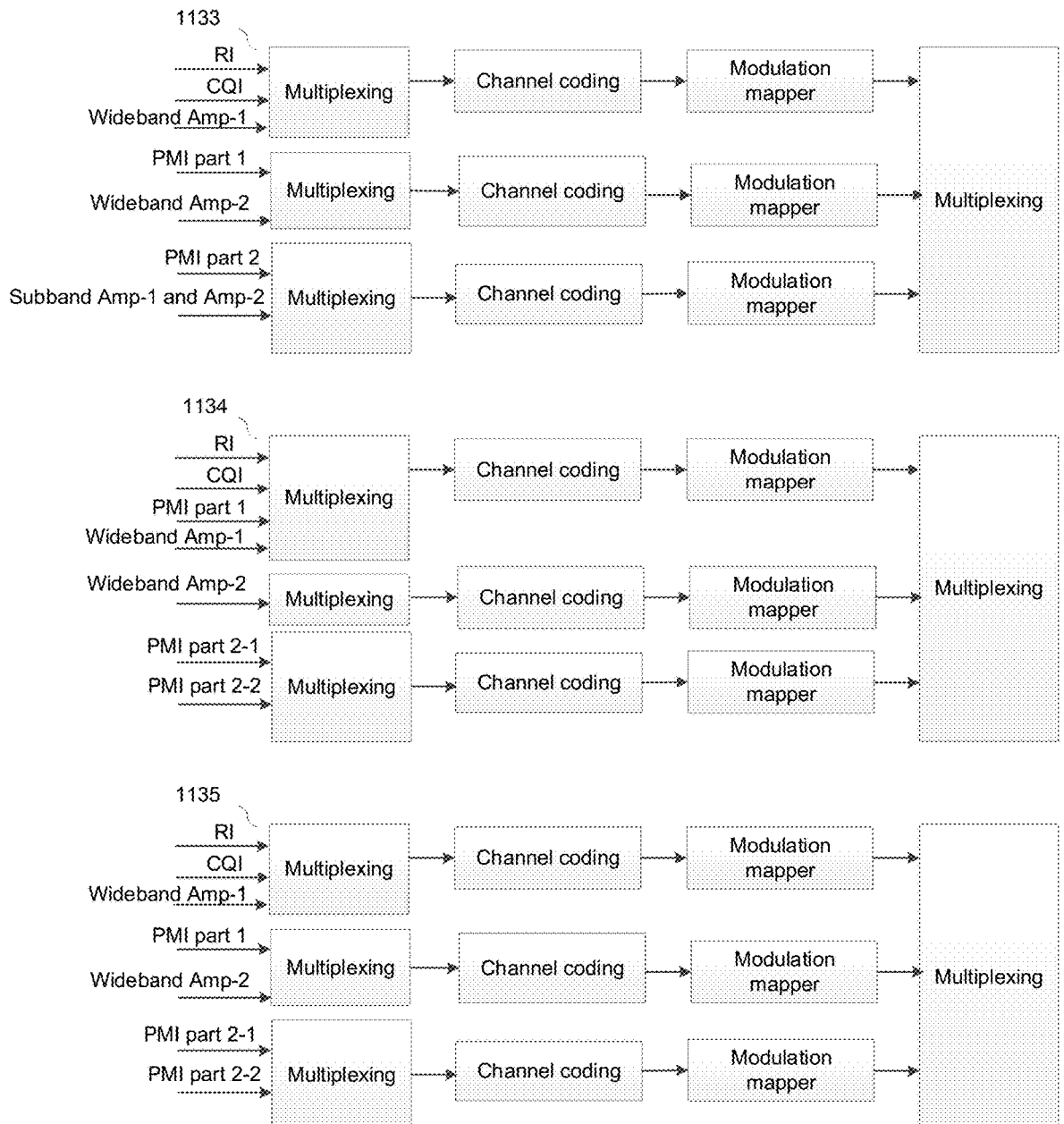

Optionally, as illustrated in diagram 1133 of FIG. 11E, part 1 includes RI, CQI, and Wideband Amp-1 whereas part 2 includes PMI part 1 and Wideband Amp-2 (Wideband Amp-2 is included only if RI=2, otherwise only PMI part 1 is included) in part 2.

In the previous embodiments (illustrated in diagrams 1121-1133) on Type II CSI reporting, the PMI part 1 ($i_1$) indicates the following two components: 1) The rotation factor ($q_1, q_2$) where $q_1, q_2 \in \{0,1,2,3\}$, which corresponds to 16 combinations (hence requires 4-bits reporting), and 2) The selection of L orthogonal beams, which is either joint, $\lceil \log_2 \binom{N_1 N_2}{L} \rceil$ bits, or independent per beam, $L \lceil \log_2(N_1 N_2) \rceil$ bits. The two components are reported either jointly or separately as two components of PMI part 1.

In the above embodiments (illustrated in diagrams 1121-1133) on Type II CSI reporting, the Wideband Amp-1 and Wideband Amp-2 can also be referred to as $RPI_0$ and $RPI_1$ where RPI stands for relative power indicator. Furthermore, $RPI_0$ indicates the strongest/leading coefficient for the first layer and Wideband (WB) amplitudes $p_{0,0}^{(WB)}, \ldots, p_{0,2L-2}^{(WB)}$ of remaining (2L-1) coefficients for the first layer, meanwhile $RPI_1$ indicates the strongest/leading coefficient for the second layer and WB amplitudes $p_{1,0}^{(WB)}, \ldots, p_{1,2L-2}^{(WB)}$ of remaining (2L-1) coefficients for the second layer.

The strongest/leading coefficients for the first layer and second layer can also be referred to as $SCI_0$ and $SCI_1$, SCI stands for strongest coefficient indicator. In a variation, $SCI_0$ and $SCI_1$ can also be reported separately from Wideband (WB) amplitudes for the two layers. In this case, $RPI_0$ and $RPI_1$ indicate the WB amplitude of the remaining (2L—1) coefficients for the two layers.

In the above embodiments (illustrated in diagrams 1121-1133) on Type II CSI reporting, the Subband Amp-1 and Subband Amp-2 can also be referred to as $SRPI_0$ and $SRPI_1$ where SRPI stands for subband relative power indicator. Furthermore, $SRPI_0$ indicates the Subband (SB) amplitudes $p_{0,0}^{(SB)}, \ldots, p_{0,2L-1}^{(SB)}$ of remaining 2L-1 coefficients for the first layer, and $SRPI_1$ indicates the Subbband (SB) amplitudes $p_{1,0}^{(SB)}, \ldots, p_{1,2L-1}^{(SB)}$ of remaining 2L-1 coefficients for the second layer.

In the above embodiments (illustrated in diagrams 1121-1133) on Type II CSI reporting, the PMI part 2 ($i_2$) indicates the SB phase of 2L-1 coefficients for each layer. So, if RI=1, then PMI part 2 corresponds to $i_2 = i_{2,0}$ for one layer, and if RI=2, then PMI part 2 corresponds to $i_2 = (i_{2,0}, i_{2,1})$ for two layers.

For each layer, the SB phase and SB amplitude can also be reported jointly as PMI part 2-1 (comprising $i_{2,0}$ and $SRPI_0$ for the first layer) and PMI part 2-2 (comprising $i_{2,1}$ and $SRPI_1$ for the second layer). Two examples are illustrated in FIG. 11E (diagrams 1134 and 1135).

In the embodiments on Type II CSI reporting, the PMI comprises a first (WB) PMI $i_1$ and a second (SB) PMI $i_2$. The first PMI $i_1 = [i_{1,1}, i_{1,2}, i_{1,3}, i_{1,4}]$ comprises two layer-common (i.e., reported common for two layers if UE reports RI=2) components: 1) Orthogonal basis set (indicated using index $i_{1,1}$ indicating the rotation factors ($q_1, q_2$)) and 2) L beam selection (indicated using index $i_{1,2}$). In addition, two layer-specific (i.e., reported for each of the two layers if UE reports RI=2) components are reported: 1) Strongest coefficient (indicated using index $i_{1,3}$) and 2) WB amplitudes $p_{l,i}^{(1)}$ (indicated using index $i_{1,4}$).

The indices $i_{1,3}$ and $i_{1,4}$ can be further described as $$i_{1,3} = \begin{cases} [i_{1,3,1}] & RI = 1 \\ [i_{1,3,1}\ i_{1,3,2}] & RI = 2 \end{cases} \text{ and}$$

$$i_{1,4} = \begin{cases} [i_{1,4,1}] & RI = 1 \\ [i_{1,4,1}\ i_{1,4,2}] & RI = 2 \end{cases}.$$

The second PMI $i_2 = [i_{2,1}, i_{2,2}]$ comprises two layer-specific components: 1) SB phase $c_{l,i}$ indicated using index $i_{2,1}$ and 2) SB amplitude $p_{l,i}^{(2)}$ (which can be turned ON or OFF by RRC signaling) indicated using index $i_{2,2}$, wherein $$i_{2,1} = \begin{cases} [i_{2,1,1}] & RI = 1 \\ [i_{2,1,1}\ i_{2,1,2}] & RI = 2 \end{cases} \text{ and}$$

$$i_{2,2} = \begin{cases} [i_{2,2,1}] & RI = 1 \\ [i_{2,2,1}\ i_{2,2,2}] & RI = 2 \end{cases}.$$

Note that $i_{1,3,2}, i_{1,4,2}, i_{2,1,2},$ and $i_{2,1,2}$ are reported only when RI=2 is reported. The subscript $l \in \{0,1\}$ is used for layers, and the subscript $i \in \{0,1,\ldots,2L-1\}$ is used for coefficients. The first PMI is reported in a wideband (WB) manner and the second PMI can be reported in a wideband or subband (SB) manner.

Figure 11F:
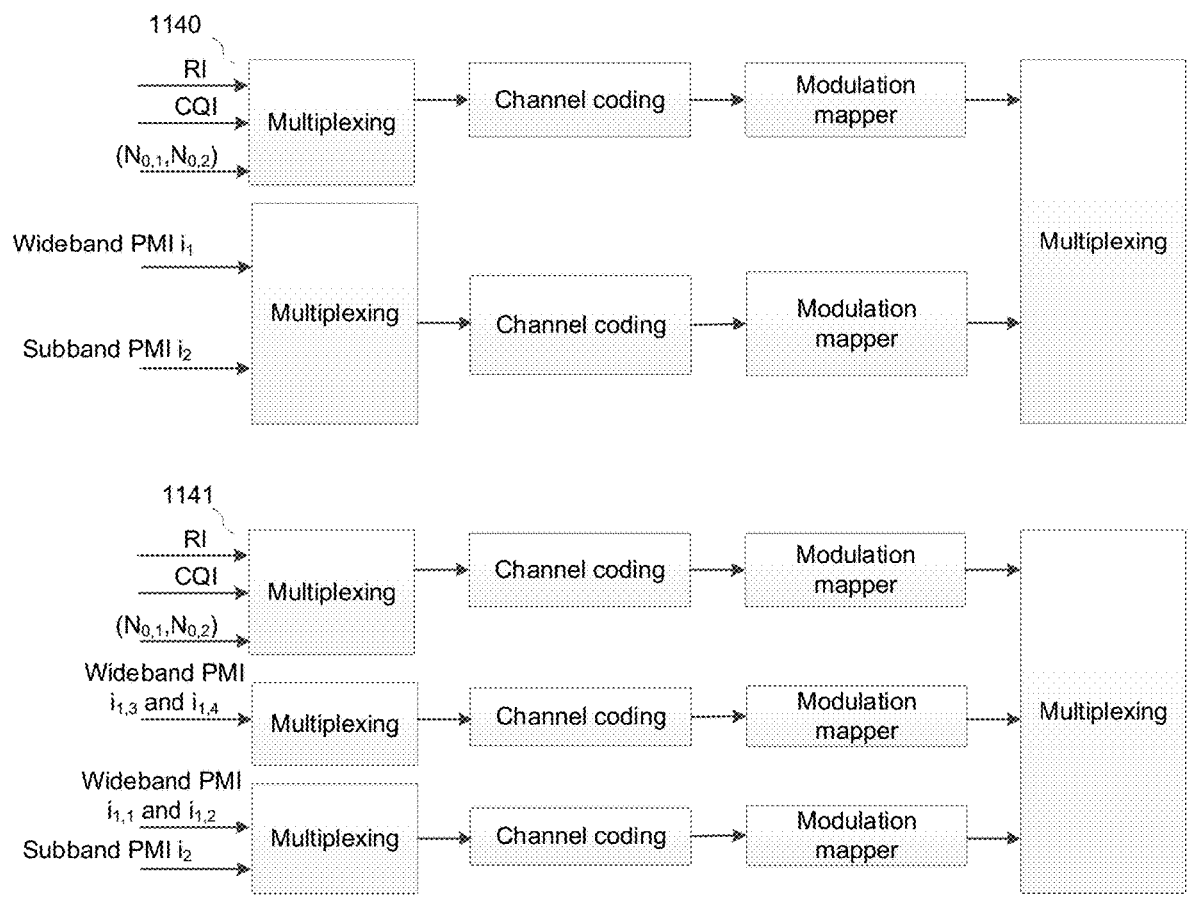

In the embodiment illustrated in diagram 1140 which is applicable to Type II with rank 1-2, as shown in FIG. 11F, two-part UCI multiplexing is used wherein CQI, RI, and ($N_{0,1}, N_{0,2}$) are multiplexed and encoded together in part 1, where $N_{0,1}$ and $N_{0,2}$ respectively indicate (DEF A) the number of reported WB amplitudes that are zero for layer 1 and layer 2 respectively, i.e., $p_{l,i}^{(1)} = 0$; or optionally, they indicate (DEF B) the number of reported WB amplitudes that are non-zero for layer 1 and layer 2 respectively, i.e., $p_{l,i}^{(1)} \neq 0$; The remaining CSI parameters are multiplexed and encoded together in part 2, where the remaining CSI includes the first PMI $i_1$ and the second PMI ($i_2$).

Based on the value of the reported ($N_{0,1}, N_{0,2}$) in part 1, the CSI reporting payload (bits) for part 2 is determined. In particular, the components of the second PMI $i_2$ are reported only for the coefficients whose corresponding reported WB amplitudes are non-zero.

In the embodiment illustrated in diagram 1141 which is applicable to Type II with rank 1-2, three-part UCI multiplexing is used wherein part 1 is the same as in the embodiment illustrated in diagram 1140, part 2 and part 3 comprise the components of the first PMI $i_1$ and the second PMI $i_2$ according to at least one of the options shown in TABLE 3 An illustration (for diagram 1141 in TABLE 3) is shown in FIG. 11F.

TABLE 3

Options for part 2 and part 3 for the embodiment illustrated in diagram 1141

| Options | Part 2 | Part 3 |
| --- | --- | --- |
| 1141-0 | $i_1$ | $i_2$ |
| 1141-1 | $i_{1,3}, i_{1,4}$ | $i_{1,1}, i_{1,2}, i_2$ |
| 1141-2 | $i_{1,3}$ | $i_{1,1}, i_{1,2}, i_{1,4}, i_2$ |
| 1141-3 | $i_{1,4}$ | $i_{1,1}, i_{1,2}, i_{1,3}, i_2$ |

The number of candidate values for ($N_{0,1}, N_{0,2}$) reporting depends on the value of L which is configured (via RRC). At least one of the following options is used to report ($N_{0,1}, N_{0,2}$). In one option (Alt A), wherein we assume DEF A for ($N_{0,1}, N_{0,2}$), $N_{0,1}$ and $N_{0,2}$ takes a value from $\{0,1, \ldots, 2L-1\}$. In another option (Alt B), wherein we assume DEF A for $(N_{0,1}, N_{0,2})$, $N_{0,1}$ and $N_{0,2}$ takes a value from $\{0,1,\ldots, 2L-2\}$, since the WB amplitude for the strongest coefficient (indicated by $i_{1,3}$) can't be zero, it is excluded in reporting $N_{0,1}$ and $N_{0,2}$ and hence the range of values for $N_{0,1}$ and $N_{0,2}$ can be reduced by 1. In another option (Alt C), wherein we assume DEF B for $(N_{0,1}, N_{0,2})$, $N_{0,1}$ and $N_{0,2}$ takes a value from $\{0,1,\ldots, 2L-1\}$. In another option (Alt D), wherein we assume DEF B for $(N_{0,1}, N_{0,2})$, $N_{0,1}$ and $N_{0,2}$ takes a value from $\{0,1,\ldots, 2L-2\}$ (or optionally $\{1,2,\ldots, 2L-1\}$), since the WB amplitude for the strongest coefficient (indicated by $i_{1,3}$) is always non-zero, it is excluded (or optionally always included) in reporting $N_{0,1}$ and $N_{0,2}$ and hence the range of values for $N_{0,1}$ and $N_{0,2}$ can be reduced by 1. In one option (Alt E), wherein we assume DEF A for $(N_{0,1}, N_{0,2})$, $N_{0,1}$ takes a value from $\{0,1,\ldots, 2L-1\}$, and $N_{0,2}=2L$ if RI=1 and takes a value from $\{0,1,\ldots, 2L-1\}$ if RI=2. In one option (Alt F), wherein we assume DEF B for $(N_{0,1}, N_{0,2})$, $N_{0,1}$ takes a value from $\{1,\ldots, 2L\}$, and $N_{0,2}=0$ if RI=1 and takes a value from $\{1,\ldots, 2L\}$ if RI=2. Note that the minimum value that $N_{0,1}$ and $N_{0,2}$ can take is 1 since the strongest coefficient (indicated by $i_{1,3}$) is always non-zero (equals 1). Optionally, if the strongest coefficient is excluded in determining $(N_{0,1}, N_{0,2})$, then $N_{0,1}$ takes a value from $\{0,\ldots, 2L-1\}$, and $N_{0,2}=-1$ if RI=1 and takes a value from $\{0,\ldots, 2L-1\}$ if RI=2. The former values for $(N_{0,1}, N_{0,2})$ are assumed in later embodiments involving Alt F. The embodiments are however general and are applicable to the later values. In one option (Alt G), wherein we assume DEF A for $(N_{0,1}, N_{0,2})$, $N_{0,1}$ takes a value from $\{0,1,\ldots, P-1\}$, and $N_{0,2}=P$ if RI=1 and takes a value from $\{0,1,\ldots, P-1\}$ if RI=2, where $0<P\leq 2L$. In one option (Alt H), wherein we assume DEF B for $(N_{0,1}, N_{0,2})$, $N_{0,1}$ takes a value from $\{2L-P+1,\ldots, 2L\}$, and $N_{0,2}=0$ if RI=1 and takes a value from $\{2L-P+1,\ldots, 2L\}$ if RI=2, where $0<P\leq 2L$. Note that the minimum value that $N_{0,1}$ and $N_{0,2}$ can take is 1 since the strongest coefficient (indicated by $i_{1,3}$) is always non-zero (equals 1). Optionally, if the strongest coefficient is excluded in determining $(N_{0,1}, N_{0,2})$, $N_{0,1}$ takes a value from $\{2L-P,\ldots, 2L-1\}$, and $N_{0,2}=-1$ if RI=1 and takes a value from $\{2L-P,\ldots, 2L-1\}$ if RI=2. The former values for $(N_{0,1}, N_{0,2})$ are assumed in later embodiments involving Alt H. The embodiments are however general and are applicable to the later values.

An example value for P in Alt G and Alt H is fixed to P=L. Optionally, P is configured via higher layer (RRC) signaling or more dynamic MAC CE based or DCI based signaling.

In one sub-embodiment of this embodiment, the RI and $(N_{0,1}, N_{0,2})$ are reported separately using 1-bit for RI reporting, and $\lceil \log_2(2L) \rceil$ bits (for Alt A, Alt C, Alt E, and Alt F) or $\lceil \log_2(2L-1) \rceil$ bits (for Alt B and D) or $\lceil \log_2(P) \rceil$ bits (for Alt G and H) if RI=1 is reported, and using $2 \lceil \log_2(2L) \rceil$ bits (for Alt A, Alt C, Alt E, and Alt F) or $2 \lceil \log_2(2L-1) \rceil$ bits (for Alt B and D) or $2 \lceil \log_2(P) \rceil$ bits (for Alt G and H) if RI=2 is reported.

In another sub-embodiment of this embodiment (based on Alt A to Alt D), the RI and $(N_{0,1}, N_{0,2})$ are reported joint according to at least one of the following options. In one option, wherein we assume Alt A or Alt C for $(N_{0,1}, N_{0,2})$ reporting, $N_{0,1}$ and $N_{0,2}$ takes a value from $\{0,1,\ldots, 2L-1\}$. The corresponding joint RI and $(N_{0,1}, N_{0,2})$ reporting table is as shown in TABLE 4. Optionally, the joint reporting is according to separate tables as shown in TABLE 5, TABLE 6, and TABLE 7 for L=2, 3, and 4, respectively. The number of bits to report (I) for this joint report is $\lceil \log_2(4L^2+2L) \rceil$ which corresponds to 5, 6, and 7 bits for L=2, 3, and 4, respectively. In one option, wherein we assume Alt B or Alt D for $(N_{0,1}, N_{0,2})$ reporting, $N_{0,1}$ and $N_{0,2}$ takes a value from $\{0,1,\ldots, 2L-2\}$. The corresponding joint RI and $(N_{0,1}, N_{0,2})$ reporting table is as shown in TABLE 8. Optionally, the joint reporting is according to separate tables as shown in TABLE 9, 10, and 11 for L=2, 3, and 4, respectively. The number of bits to report (I) for this joint report is $\lceil \log_2(4L^2-2L) \rceil$ which corresponds to 4, 5, and 6 bits for L=2, 3, and 4, respectively.

TABLE 4

Joint RI and $(N_{0,1}, N_{0,2})$ reporting table for all L

| Index (I) | RI | $(N_{0,1}, N_{0,2})$ or $(N_{0,2}, N_{0,1})$ |
|---|---|---|
| 0 to 2L − 1 | 1 | (0, 0), (1, 0), (2, 0), . . . (2L − 1, 0) |
| 2L to 4L − 1 | 2 | (0, 0), (1, 0), (2, 0), . . . (2L − 1, 0) |
| 4L to 6L − 1 |  | (0, 1), (1, 1), (2, 1), . . . (2L − 1, 1) |
| . . . |  | . . . |
| $4L^2$ to $4L^2 + 2L - 1$ |  | (0, 2L − 1), (1, 2L − 1), (2, 2L − 1), . . . (2L − 1, 2L − 1) |

TABLE 5

Joint RI and $(N_{0,1}, N_{0,2})$ reporting table for L = 2

| Index (I) | RI | $(N_{0,1}, N_{0,2})$ or $(N_{0,2}, N_{0,1})$ |
|---|---|---|
| 0 to 3 | 1 | (0, 0), (1, 0), (2, 0), (3, 0) |
| 4 to 7 | 2 | (0, 0), (1, 0), (2, 0), (3, 0) |
| 8 to 11 |  | (0, 1), (1, 1), (2, 1), (3, 1) |
| 12 to 15 |  | (0, 2), (1, 2), (2, 2), (3, 2) |
| 16 to 19 |  | (0, 3), (1, 3), (2, 3), (3, 3) |

TABLE 6

Joint RI and $(N_{0,1}, N_{0,2})$ reporting table for L = 3

| Index (I) | RI | $(N_{0,1}, N_{0,2})$ or $(N_{0,2}, N_{0,1})$ |
|---|---|---|
| 0 to 5 | 1 | (0, 0), (1, 0), (2, 0), . . . (5, 0) |
| 6 to 11 | 2 | (0, 0), (1, 0), (2, 0), . . . (5, 0) |
| 12 to 17 |  | (0, 1), (1, 1), (2, 1), . . . (5, 1) |
| . . . |  | . . . |
| 36 to 41 |  | (0, 5), (1, 5), (2, 5), . . . (5, 5) |

TABLE 7

Joint RI and $(N_{0,1}, N_{0,2})$ reporting table for L = 4

| Index (I) | RI | $(N_{0,1}, N_{0,2})$ or $(N_{0,2}, N_{0,1})$ |
|---|---|---|
| 0 to 7 | 1 | (0, 0), (1, 0), (2, 0), . . . (7, 0) |
| 8 to 15 | 2 | (0, 0), (1, 0), (2, 0), . . . (7, 0) |
| 16 to 23 |  | (0, 1), (1, 1), (2, 1), . . . (7, 1) |
| . . . |  | . . . |
| 64 to 71 |  | (0, 7), (1, 7), (2, 7), . . . (7, 7) |

TABLE 8

Joint RI and $(N_{0,1}, N_{0,2})$ reporting table for all L

| Index (I) | RI | $(N_{0,1}, N_{0,2})$ or $(N_{0,2}, N_{0,1})$ |
|---|---|---|
| 0 to 2L − 2 | 1 | (0, 0), (1, 0), (2, 0), . . . (2L − 2, 0) |
| 2L − 1 to 4L − 3 | 2 | (0, 0), (1, 0), (2, 0), . . . (2L − 2, 0) |
| 4L − 2 to 6L − 4 |  | (0, 1), (1, 1), (2, 1), . . . (2L − 2, 1) |
| . . . |  | . . . |
| $4L^2 - 4L + 1$ to $4L^2 - 2L - 1$ |  | (0, 2L − 2), (1, 2L − 2), (2, 2L − 2), . . . (2L − 2, 2L − 2) |

TABLE 9

Joint RI and ($N_{0,1}$, $N_{0,2}$) reporting table for L = 2

| Index (I) | RI | ($N_{0,1}$, $N_{0,2}$) or ($N_{0,2}$, $N_{0,1}$) |
|---|---|---|
| 0 to 2 | 1 | (0, 0), (1, 0), (2, 0) |
| 3 to 5 | 2 | (0, 0), (1, 0), (2, 0) |
| 6 to 8 |   | (0, 1), (1, 1), (2, 1) |
| 9 to 11 |   | (0, 2), (1, 2), (2, 2) |

TABLE 10

Joint RI and ($N_{0,1}$, $N_{0,2}$) reporting table for L = 3

| Index (I) | RI | ($N_{0,1}$, $N_{0,2}$) or ($N_{0,2}$, $N_{0,1}$) |
|---|---|---|
| 0 to 4 | 1 | (0, 0), (1, 0), (2, 0), . . . (4, 0) |
| 5 to 9 | 2 | (0, 0), (1, 0), (2, 0), . . . (4, 0) |
| 10 to 14 |   | (0, 1), (1, 1), (2, 1), . . . (4, 1) |
| . . . |   | . . . |
| 25 to 29 |   | (0, 4), (1, 4), (2, 4), . . . (4, 4) |

TABLE 11

Joint RI and ($N_{0,1}$, $N_{0,2}$) reporting table for L = 4

| Index (I) | RI | ($N_{0,1}$, $N_{0,2}$) or ($N_{0,2}$, $N_{0,1}$) |
|---|---|---|
| 0 to 6 | 1 | (0, 0), (1, 0), (2, 0), . . . (6, 0) |
| 7 to 13 | 2 | (0, 0), (1, 0), (2, 0), . . . (6, 0) |
| 14 to 20 |   | (0, 1), (1, 1), (2, 1), . . . (6, 1) |
| . . . |   | . . . |
| 49 to 55 |   | (0, 6), (1, 6), (2, 6), . . . (6, 6) |

In another sub-embodiment of this embodiment (based on Alt E and Alt F), the RI and ($N_{0,1}$,$N_{0,2}$) are reported joint according to at least one of the following options. In one option, wherein we assume Alt E for ($N_{0,1}$,$N_{0,2}$) reporting, the joint RI and ($N_{0,1}$,$N_{0,2}$) reporting table is as shown in TABLE 12. Optionally, the joint reporting is according to separate tables as shown in TABLE 13, 14, and 15 for L=2, 3, and 4, respectively. The number of bits to report (I) for this joint report is $\lceil \log_2(4L^2+2L) \rceil$ which corresponds to 5, 6, and 7 bits for L=2, 3, and 4, respectively. In one option, wherein we assume Alt F for ($N_{0,1}$,$N_{0,2}$) reporting, the joint RI and ($N_{0,1}$,$N_{0,2}$) reporting table is as shown in TABLE 16. Optionally, the joint reporting is according to separate tables as shown in TABLE 17, 18, and 19 for L=2, 3, and 4, respectively. The number of bits to report (I) for this joint report is $\lceil \log_2(4L^2+2L) \rceil$ which corresponds to 5, 6, and 7 bits for L=2, 3, and 4, respectively.

TABLE 12

Joint RI and ($N_{0,1}$, $N_{0,2}$) reporting table for all L

| Index (I) | RI | ($N_{0,1}$, $N_{0,2}$) or ($N_{0,2}$, $N_{0,1}$) |
|---|---|---|
| 0 to 2L − 1 | 1 | (0, 2L), (1, 2L), (2, 2L), . . . (2L − 1, 2L) |
| 2L to 4L − 1 | 2 | (0, 0), (1, 0), (2, 0), . . . (2L − 1, 0) |
| 4L to 6L − 1 |   | (0, 1), (1, 1), (2, 1), . . . (2L − 1, 1) |
| . . . |   | . . . |
| $4L^2$ to $4L^2$ + 2L − 1 |   | (0, 2L − 1), (1, 2L − 1), (2, 2L − 1), . . . (2L − 1, 2L − 1) |

TABLE 13

Joint RI and ($N_{0,1}$, $N_{0,2}$) reporting table for L = 2

| Index (I) | RI | ($N_{0,1}$, $N_{0,2}$) or ($N_{0,2}$, $N_{0,1}$) |
|---|---|---|
| 0 to 3 | 1 | (0, 4), (1, 4), (2, 4), (3, 4) |
| 4 to 7 | 2 | (0, 0), (1, 0), (2, 0), (3, 0) |
| 8 to 11 |   | (0, 1), (1, 1), (2, 1), (3, 1) |
| 12 to 15 |   | (0, 2), (1, 2), (2, 2), (3, 2) |
| 16 to 19 |   | (0, 3), (1, 3), (2, 3), (3, 3) |

TABLE 14

Joint RI and ($N_{0,1}$, $N_{0,2}$) reporting table for L = 3

| Index (I) | RI | ($N_{0,1}$, $N_{0,2}$) or ($N_{0,2}$, $N_{0,1}$) |
|---|---|---|
| 0 to 5 | 1 | (0, 6), (1, 6), (2, 6), . . . (5, 6) |
| 6 to 11 | 2 | (0, 0), (1, 0), (2, 0), . . . (5, 0) |
| 12 to 17 |   | (0, 1), (1, 1), (2, 1), . . . (5, 1) |
| . . . |   | . . . |
| 36 to 41 |   | (0, 5), (1, 5), (2, 5), . . . (5, 5) |

TABLE 15

Joint RI and ($N_{0,1}$, $N_{0,2}$) reporting table for L = 4

| Index (I) | RI | ($N_{0,1}$, $N_{0,2}$) or ($N_{0,2}$, $N_{0,1}$) |
|---|---|---|
| 0 to 7 | 1 | (0, 8), (1, 8), (2, 8), . . . (7, 8) |
| 8 to 15 | 2 | (0, 0), (1, 0), (2, 0), . . . (7, 0) |
| 16 to 23 |   | (0, 1), (1, 1), (2, 1), . . . (7, 1) |
| . . . |   | . . . |
| 64 to 71 |   | (0, 7), (1, 7), (2, 7), . . . (7, 7) |

TABLE 16

Joint RI and ($N_{0,1}$, $N_{0,2}$) reporting table for all L

| Index (I) | RI | ($N_{0,1}$, $N_{0,2}$) or ($N_{0,2}$, $N_{0,1}$) |
|---|---|---|
| 0 to 2L − 1 | 1 | (1, 0), (2, 0), (3, 0), (2L, 0) |
| 2L to 4L − 1 | 2 | (1, 1), (2, 1), (3, 1), (2L, 1) |
| 4L to 6L − 1 |   | (1, 2), (2, 2), (3, 2), (2L, 2) |
| . . . |   | . . . |
| $4L^2$ to $4L^2$ + 2L − 1 |   | (1, 2L), (2, 2L), (3, 2L), . . . (2L, 2L) |

TABLE 17

Joint RI and ($N_{0,1}$, $N_{0,2}$) reporting table for L = 2

| Index (I) | RI | ($N_{0,1}$, $N_{0,2}$) or ($N_{0,2}$, $N_{0,1}$) |
|---|---|---|
| 0 to 3 | 1 | (1, 0), (2, 0), (3, 0), (4, 0) |
| 4 to 7 | 2 | (1, 1), (2, 1), (3, 1), (4, 1) |
| 8 to 11 |   | (1, 2), (2, 2), (3, 2), (4, 2) |
| 12 to 15 |   | (1, 3), (2, 3), (3, 3), (4, 3) |
| 16 to 19 |   | (1, 4), (2, 4), (3, 4), (4, 4) |

TABLE 18

Joint RI and ($N_{0,1}$, $N_{0,2}$) reporting table for L = 3

| Index (I) | RI | ($N_{0,1}$, $N_{0,2}$) or ($N_{0,2}$, $N_{0,1}$) |
|---|---|---|
| 0 to 5 | 1 | (1, 0), (2, 0), . . . , (6, 0) |
| 6 to 11 | 2 | (1, 1), (2, 1), . . . , (6, 1) |
| 12 to 17 |  | (1, 2), (2, 2), . . . , (6, 2) |
| . . . |  | . . . |
| 36 to 41 |  | (1, 6), (2, 6), . . . , (6, 6) |

TABLE 19

Joint RI and ($N_{0,1}$, $N_{0,2}$) reporting table for L = 4

| Index (I) | RI | ($N_{0,1}$, $N_{0,2}$) or ($N_{0,2}$, $N_{0,1}$) |
|---|---|---|
| 0 to 7 | 1 | (1, 0), (2, 0), . . . , (8, 0) |
| 8 to 15 | 2 | (1, 1), (2, 1), . . . , (8, 1) |
| 16 to 23 |  | (1, 2), (2, 2), . . . , (8, 2) |
| . . . |  | . . . |
| 64 to 71 |  | (1, 8), (2, 8), . . . , (8, 8) |

In another sub-embodiment of this embodiment (based on Alt G and Alt H), the RI and ($N_{0,1}$, $N_{0,2}$) are reported joint according to at least one of the following options. In one option, wherein we assume Alt E for ($N_{0,1}$, $N_{0,2}$) reporting, the joint RI and ($N_{0,1}$, $N_{0,2}$) reporting table is as shown in TABLE 20. Optionally, the joint reporting is according to separate tables as shown in TABLE 21, 22, and 23 for L=2, 3, and 4, respectively. The number of bits to report (I) for this joint report is $\lceil \log_2(P^2+P) \rceil$ which corresponds to 3, 4, and 5 bits for L=2, 3, and 4, respectively. In one option, wherein we assume Alt F for ($N_{0,1}$, $N_{0,2}$) reporting, the joint RI and ($N_{0,1}$, $N_{0,2}$) reporting table is as shown in TABLE 24. Optionally, the joint reporting is according to separate tables as shown in TABLE 25, 26, and 27 for L=2, 3, and 4, respectively. The number of bits to report (I) for this joint report is $\lceil \log_2(P^2+P) \rceil$ which corresponds to 3, 4, and 5 bits for L=2, 3, and 4, respectively.

TABLE 20

Joint RI and ($N_{0,1}$, $N_{0,2}$) reporting table for all L

| Index (I) | RI | ($N_{0,1}$, $N_{0,2}$) or ($N_{0,2}$, $N_{0,1}$) |
|---|---|---|
| 0 to P − 1 | 1 | (0, P), (1, P), (2, P), (P − 1, P) |
| P to 2P − 1 | 2 | (0, 0), (1, 0), (2, 0), (P − 1, 0) |
| 2P to 3P − 1 |  | (0, 1), (1, 1), (2, 1), (P − 1, 1) |
| . . . |  | . . . |
| $P^2$ to $P^2$ + P − 1 |  | (0, P − 1), (1, P − 1), (2, P − 1), (P − 1, P − 1) |

TABLE 21

Joint RI and ($N_{0,1}$, $N_{0,2}$) reporting table for P = L = 2

| Index (I) | RI | ($N_{0,1}$, $N_{0,2}$) or ($N_{0,2}$, $N_{0,1}$) |
|---|---|---|
| 0, 1 | 1 | (0, 2), (1, 2) |
| 2, 3 | 2 | (0, 0), (1, 0) |
| 4, 5 |  | (0, 1), (1, 1) |

TABLE 22

Joint RI and ($N_{0,1}$, $N_{0,2}$) reporting table for P = L = 3

| Index (I) | RI | ($N_{0,1}$, $N_{0,2}$) or ($N_{0,2}$, $N_{0,1}$) |
|---|---|---|
| 0 to 2 | 1 | (0, 3), (1, 3), (2, 3) |
| 3 to 5 | 2 | (0, 0), (1, 0), (2, 0) |
| 6 to 8 |  | (0, 1), (1, 1), (2, 1) |
| 9 to 11 |  | (0, 2), (1, 3), (2, 2) |

TABLE 23

Joint RI and ($N_{0,1}$, $N_{0,2}$) reporting table for P = L = 4

| Index (I) | RI | ($N_{0,1}$, $N_{0,2}$) or ($N_{0,2}$, $N_{0,1}$) |
|---|---|---|
| 0 to 3 | 1 | (0, 4), (1, 4), (2, 4), (3, 4) |
| 4 to 7 | 2 | (0, 0), (1, 0), (2, 0), (3, 0) |
| 8 to 11 |  | (0, 1), (1, 1), (2, 1), (3, 1) |
| 12 to 15 |  | (0, 2), (1, 2), (2, 2), (3, 2) |
| 16 to 19 |  | (0, 3), (1, 3), (2, 3), (3, 3) |

TABLE 24

Joint RI and ($N_{0,1}$, $N_{0,2}$) reporting table for all L

| Index (I) | RI | ($N_{0,1}$, $N_{0,2}$) or ($N_{0,2}$, $N_{0,1}$) |
|---|---|---|
| 0 to P − 1 | 1 | (2L − P + 1, 0), . . . (2L, 0) |
| P to 2P − 1 | 2 | (2L − P + 1, 2L − P + 1), . . . , (2L, 2L − P + 1) |
| . . . |  | . . . |
| $P^2$ to $P^2$ + P − 1 |  | (2L − P + 1, 2L), . . . (2L, 2L) |

TABLE 25

Joint RI and ($N_{0,1}$, $N_{0,2}$) reporting table for P = L = 2

| Index (I) | RI | ($N_{0,1}$, $N_{0,2}$) or ($N_{0,2}$, $N_{0,1}$) |
|---|---|---|
| 0, 1 | 1 | (3, 0), (4, 0) |
| 2, 3 | 2 | (3, 3), (4, 3) |
| 4, 5 |  | (3, 4), (4, 4) |

TABLE 26

Joint RI and ($N_{0,1}$, $N_{0,2}$) reporting table for P = L = 3

| Index (I) | RI | ($N_{0,1}$, $N_{0,2}$) or ($N_{0,2}$, $N_{0,1}$) |
|---|---|---|
| 0 to 2 | 1 | (4, 0), (5, 0), (6, 0) |
| 3 to 5 | 2 | (4, 4), (5, 4), (6, 4) |
| 6 to 8 |  | (4, 5), (5, 5), (6, 5) |
| 9 to 11 |  | (4, 6), (5, 6), (6, 6) |

TABLE 27

Joint RI and ($N_{0,1}$, $N_{0,2}$) reporting table for P = L = 4

| Index (I) | RI | ($N_{0,1}$, $N_{0,2}$) or ($N_{0,2}$, $N_{0,1}$) |
|---|---|---|
| 0 to 3 | 1 | (5, 0), (6, 0), (7, 0), (8, 0) |
| 4 to 7 | 2 | (5, 5), (6, 5), (7, 5), (8, 5) |
| 8 to 11 |  | (5, 6), (6, 6), (7, 6), (8, 6) |
| 12 to 15 |  | (5, 7), (6, 7), (7, 7), (8, 7) |
| 16 to 19 |  | (5, 8), (6, 8), (7, 8), (8, 8) |

Figure 11G:
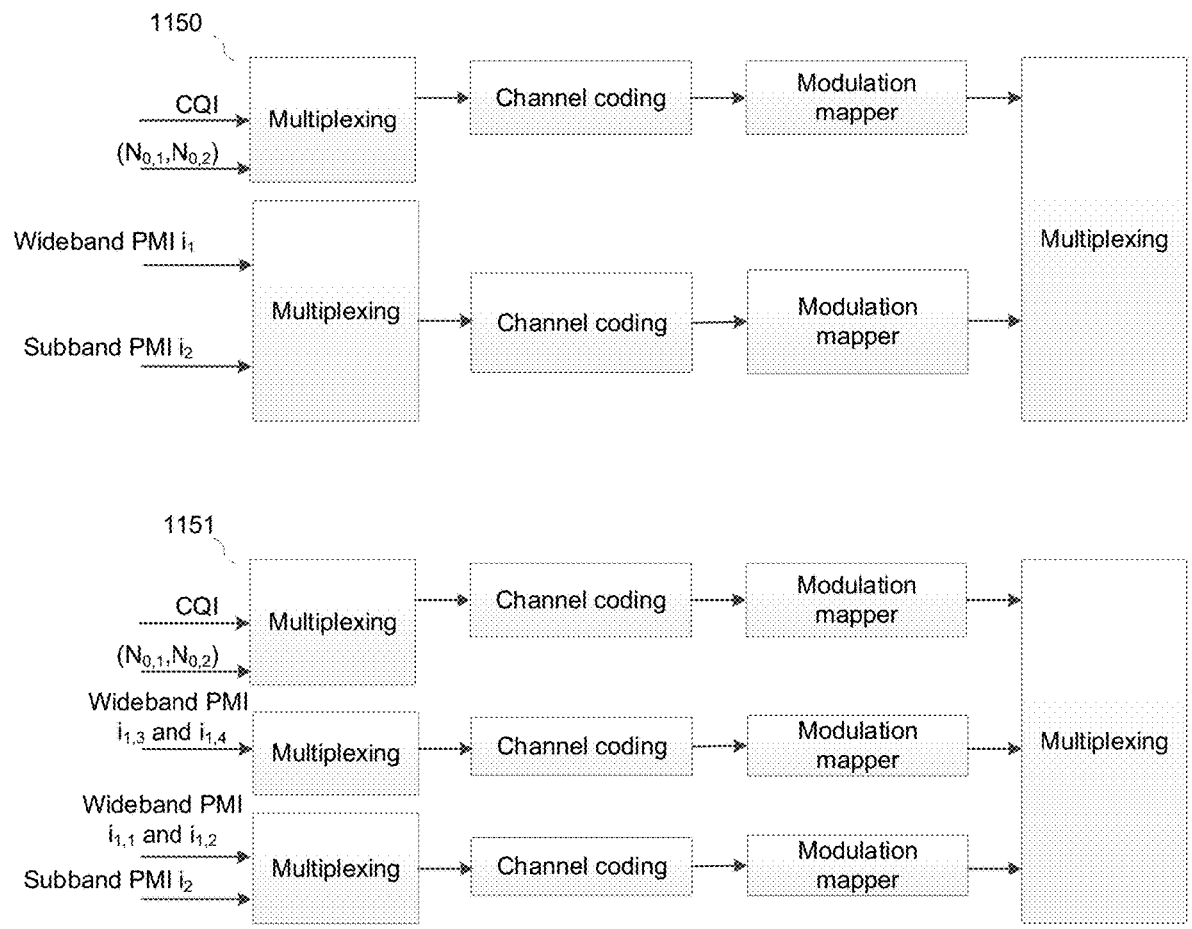

In the embodiment illustrated in diagram 1150 which is applicable to Type II with rank 1-2, as shown in FIG. 11G, two-part UCI multiplexing is used wherein the two parts are the same as in the embodiment illustrated in diagram 1140 except that RI is not reported explicitly in part 1. RI is derived implicitly using reported ($N_{0,1}$, $N_{0,2}$). In particular, the reported $N_{0,2}$ value is used to derive RI value according to at least one of the following options. In one option, assuming Alt E for ($N_{0,1}$, $N_{0,2}$) reporting, if $N_{0,2}$=2L, then RI=1, otherwise ($N_{0,2} \in \{0,1, \ldots, 2L-1\}$,) RI=2. In another option, assuming Alt F for ($N_{0,1}$, $N_{0,2}$) reporting, if $N_{0,2}$=0, then RI=1, otherwise ($N_{0,2} \varepsilon \{1,2,\ldots,2L\}$), RI=2. In another option, assuming Alt G for ($N_{0,1}$, $N_{0,2}$) reporting, if $N_{0,2}$=P, then RI=1, otherwise ($N_{0,2} \in \{0,1, \ldots, P-1\}$), RI=2. In another option, assuming Alt H for ($N_{0,1}$, $N_{0,2}$) reporting, if $N_{0,2}$=0, then RI=1, otherwise ($N_{0,2} \in \{2L-P+1, \ldots, 2L\}$), RI=2.

In the embodiment illustrated in diagram 1151 which is applicable to Type II with rank 1-2, as shown in FIG. 11G, three-part UCI multiplexing is used wherein the three parts are the same as in the embodiment illustrated in diagram 1141 (with four options in TABLE 3) except that RI is not reported explicitly in part 1. RI is derived implicitly using reported ($N_{0,1}$, $N_{0,2}$). In particular, the reported $N_{0,2}$ value is used to derive RI value according to at least one of the options in the embodiment illustrated in diagram 1150.

In another embodiment which is a variation of the embodiment illustrated in diagram 1140, instead of reporting ($N_{0,1}$, $N_{0,2}$) for number of WB amplitudes that are zero or non-zero, an indicator is reported for each WB amplitude using a bitmap B which is a concatenation of two bitmaps, i.e., $B=B_0 B_1$ or $B_1 B_0$, where each of bitmap $B_0 = b_{0,0} b_{0,1} \ldots b_{0,2L-1}$ and bitmap $B_1 = b_{1,0} b_{1,1} \ldots, b_{1,2L-1}$ is of length 2L. If a bit $b_{i,j}$=0, then the corresponding WB amplitude is zero, and if a bit $b_{i,j}$=1, then the corresponding WB amplitude is non-zero. Optionally, if a bit $b_{i,j}$=0, then the corresponding WB amplitude is non-zero, and if a bit $b_{i,j}$=1, then the corresponding WB amplitude is zero. An example of the bitmap for RI=1 and 2 is illustrated in TABLE 28. So, the number of bits to report RI=1 or 2 and WB amplitude bitmap B is 4L+1, which corresponds to 9, 13, and 17 bits for L=2, 3, and 4, respectively. The PMI payload to reporting components of the PMI ($i_1$ and $i_2$) in CSI part 2 is fixed once the CSI part 1 is decoded since only the components of the PMI corresponding to non-zero WB amplitudes need to be reported.

This embodiment is also applicable to the variations of embodiments illustrated in diagrams 1140, 1141, 1150, and/or 1151, by replacing ($N_{0,1}$, $N_{0,2}$) reporting with the WB amplitude bitmap B reporting.

Also, for a given beam, all four WB amplitude indicators (2 polarizations and 2 layers) indicate zero WB amplitude, then the corresponding beam is not reported using the PMI index $i_{1,2}$. Optionally, L beams are reported regardless of the reported WB amplitude bitmap.

TABLE 28

RI and WB amplitude bitmap B reporting

| RI | $B_0 = b_{0,0}, b_{0,1}, \ldots, b_{0,2L-1}$ | $B_1 = b_{1,0}, b_{1,1}, \ldots, b_{1,2L-1}$ |
|---|---|---|
| 1 | All possible bitmaps of length 2L except all-zero bitmap 00 . . . 0 | 00 . . . 0 |
| 2 | All possible bitmaps of length 2L except all-zero bitmap 00 . . . 0 | All possible bitmaps of length 2L except all-zero bitmap 00 . . . 0 |

In another embodiment, ($N_{0,1}$, $N_{0,2}$) is reported according to at least one of the following options. In one option, $N_{0,1}$ and $N_{0,2}$, respectively are reported separately using the first PMI components $i_{1,5,1}$ and $i_{1,5,2}$, or $i_{1,3,3}$ and $i_{1,3,4}$, or $i_{1,4,3}$ and $i_{1,4,4}$. In another option, $N_{0,1}$ and $N_{0,2}$, respectively are reported jointly using the first PMI components $i_{1,3,1}$ and $i_{1,3,2}$. Note that in this case, $i_{1,3,1}$ and $i_{1,3,2}$ are reported in CSI part 1. $i_{1,3,1}=[i_{1,3,1}', N_{0,1}]$ and $i_{1,3,2}=[i_{1,3,2}', N_{0,2}]$, where $i_{1,3,1}'$ and $i_{1,3,2}'$ correspond to $i_{1,3,1}$ and $i_{1,3,2}$, respectively defined earlier in the present disclosure. In another option, $N_{0,1}$ and $N_{0,2}$, respectively are reported jointly using the first PMI components $i_{1,4,1}$ and $i_{1,4,2}$. Note that in this case, $i_{1,4,1}$ and $i_{1,4,2}$ are reported in CSI part 1. $i_{1,4,1}=[i_{1,4,1}', N_{0,1}]$ and $i_{1,4,2}=[i_{1,4,2}', N_{0,2}]$, where $i_{1,4,1}'$ and $i_{1,4,2}'$ correspond to $i_{1,4,1}$ and $i_{1,4,2}$, respectively defined earlier in the present disclosure. In another option, $N_{0,1}$ and $N_{0,2}$, respectively are reported jointly using the first PMI components $i_{1,3,1}$, $i_{1,3,2}$, $i_{1,4,1}$ and $i_{1,4,2}$. Note that in this, case, $i_{1,3,1}$, $i_{1,3,2}$, $i_{1,4,1}$ and $i_{1,4,2}$ are reported in CSI part 1.

In another embodiment, the WB amplitude bitmap B is reported according to at least one of the options in the previous embodiment by replacing ($N_{0,1}$, $N_{0,2}$) with the bitmap B, or ($B_0$, $B_1$).

For any of the above embodiments with at least two CSI-UCI codeword segments or parts, when a UE is configured to report CSI for more than one (M>1) DL component carriers (CCs) in case of carrier aggregation (CA), each of the codeword segments can be formed as follow. For codeword segment k, the bit sequences associated CSI-UCIs of segment k for the M DL CCs can be concatenated ($CC_0|CC_1| \ldots |CC_{M-1}$) into one UCI codeword segment k to be encoded with a channel coding block. For Scheme 0 wherein only one codeword segment is used, the bit sequences associated CSI-UCIs for M different DL CCs can be concatenated ($CC_0|CC_1| \ldots |CC_{M-1}$) into one UCI codeword to be encoded with a channel coding block.

For any of the above embodiments, the channel coding block can include other bit-level functions such as CRC insertion, interleaving, and/or rate matching. The multiplexing block can either include or be followed with channel interleaver. In addition, some additional error protection (for example, for RI) can be introduced by, for instance, repetition or block coding before multiplexing or channel coding.

For any of the above embodiments, if some additional coding gain (or error protection) is needed for at least one CSI parameter, an extra coding (such as repetition, simplex, or block coding) can be applied prior to multiplexing the CSI parameter with at least a second CSI parameter and/or joint encoding of the aforementioned CSI parameter with at least the second CSI parameter. For example, a repetition, simplex, or short block coding can be applied to RI prior to multiplexing and channel coding. By doing so, the BLER requirement for RI can be set lower than at least another CSI parameter. In embodiments 900 or 901 of FIG. 9A, a repetition, simplex, or short block coding can be applied to RI prior to multiplexing it with CQI. In embodiments 910 or 911 of FIG. 9B, a repetition, simplex, or short block coding can be applied to RI prior to multiplexing it with CQI and PMI part I. In diagrams 1100 or 1101 of FIG. 11A, a repetition, simplex, or short block coding can be applied to RI prior to multiplexing it with CQI-1 and PMI part I. In diagrams 1110 or 1111 of FIG. 11B, a repetition, simplex, or short block coding can be applied to RI prior to multiplexing it with CQI-1.

For any of the above embodiments, RI includes one report per CSI reporting band. Likewise, CRI (which can be accompanied by at least one CSI-RSRP) including one report per CSI reporting band. CQI, depending on the UE configuration, can include one report or $N_{SB}$ reports per CSI reporting band where $N_{SB}$ is the number of subbands within the configured CSI reporting band. Likewise, PMI, depending on the UE configuration, can include one report or $N_{SB}$ reports per CSI reporting band where $N_{SB}$ is the number of subbands within the configured CSI reporting band.

For any of the above embodiments wherein CSI includes multiple segments reported in one slot, whenever RI is reported in the first segment, CRI can also be reported in the first segment just as RI.

For any of the above embodiments, the CSI-UCI content of A-CSI can be transmitted either within one subframe/slot or partitioned into multiple subframes/slots. If CSI-UCI is transmitted with UL-SCH data, CSI-UCI can be treated "similar to data" but more heavily coded, e.g., via configurable MCS or beta offset similar to LTE. Here, "similar to data" includes the use of a same RE mapping scheme and/or a same layer mapping scheme (that is, the mapping of across layers, REs, and OFDM symbols) as data. But channel coding for control information can be different from data (for example, data uses LDPC while control uses polar code or tail-biting convolutional code/TBCC).

Any of the above embodiments and sub-embodiments can be utilized independently or in combination with at least another one. If used with at least one other embodiment/sub-embodiment, a certain set of conditions of use can be specified. For example, Scheme 0 can be used in combination with Scheme 2A or 2B. Scheme 0 can be used when only one PMI is reported for the entire CSI reporting band (CRB), i.e., "wideband" or "partial-band" PMI reporting (either for Type I CSI, Type II CSI, or both types). Scheme 2A or 2B can be used for other cases, i.e., when subband PMI is reported. In this case, one of the conditions entails PMI frequency granularity.

For layer mapping, an example same scheme applied to data symbols and control symbols can be described as follows.

When a UE is granted a 1-layer transmission on PUSCH, the stream of modulated symbols $\{d(i)\}$ (indexed by i) is formed by serially concatenating all the modulated symbols. When more than one code blocks (CBs) are associated with the codeword, symbols associated with multiple CBs are concatenated. This symbol stream $\{d(i)\}$ serves as an input to layer mapping. For frequency-first mapping, a stream of modulated symbols is first mapped across frequency sub-carriers (REs) within a set of allocated PRBs, then across OFDM symbols within a scheduling time unit (slot or subframe). To illustrate, given a stream of modulated symbols $\{d(i)\}$ mapped to a "set of available REs" indexed $\{(k, l)\}$ (where k and/denote frequency/sub-carrier and time/OFDM symbol indices, respectively), as index i is increased, frequency-first mapping maps d(i) by first increasing index k from 0 to $k_{MAX}-1$ (for a fixed l), then increasing index l. That is, $k=\mathrm{mod}(i, k_{MAX})$ and $l=\lfloor i/k_{MAX}\rfloor$ where $k_{MAX}$ is the number of frequency sub-carriers (REs) in the allocated PRBs. The "set of available REs" is defined as those not occupied by UL RSs or other UL signals/channels taking precedence over UL-SCH data and CSI-UCI.

When a UE is granted an L-layer transmission on PUSCH where L>1, the stream of modulated symbols $\{d(i)\}$ (indexed by i) is also mapped across L layers in addition to REs (frequency/sub-carrier and time/OFDM symbol indices). The manner in which $\{d(i)\}$ is mapped depends on whether vertical, horizontal, or diagonal spatial mapping is used, as well as whether the spatial mapping (across layers) is performed in the granularity of modulated symbol or CB. But for a given layer, the mapping across REs is performed in the same manner as that for 1-layer transmission. For example, if symbol-level vertical spatial mapping is used, the stream of symbols is mapped first across L layers, then across frequency sub-carriers (REs) within a set of allocated PRBs, then across OFDM symbols within a scheduling time unit (slot or subframe). Denoting $M_{symb}^{layer}$, $M_{symb}^{CW}$, $x^{(l)}(i)$, and d(i) as the number of symbols per layer, the number of symbols in one CW, symbol stream for layer 1, and symbol stream for the CW, respectively, the CW-to-layer mapping can be described as follows. Here, CB segmentation and/or rate matching ensure that $M_{symb}^{CW}$ is divisible by L.

$$x^{(l)}(i)=d(Li+1),\ i=0,1,\ldots,M_{symb}^{layer}-1,\ l=0,1,\ldots,L-1 \quad \text{(Equation 1)}$$

$$M_{symb}^{layer}=M_{symb}^{CW}/L$$

If CB-level vertical spatial mapping is used, given a stream of modulated symbols $\{d(i)\}$ (indexed by i) formed by serially concatenating all the modulated symbols from μL CBs (which is associated with the single CW), the total number of modulated symbols equals $B\mu L = k_{MAX}l_{MAX}L$ where B is the number of modulated symbols per CB and $k_{MAX}l_{MAX}$ the total number of REs within the entire set of allocated PRBs across all the OFDM symbols within one scheduling time unit (slot or subframe). Hence, $$B = \frac{k_{MAX}l_{MAX}}{\mu}.$$

All the CBs are of equal size and employ the same MCS. That is, $\{CB\ n,\ CB\ n+1,\ \ldots,\ CB\ n+L-1\}$ share the same CB size B for different values of n. Here, the modulated symbol d(i) is mapped to the stream of modulated symbols associated with layer l as follows:

$$x^{(l)}(i) = d\left(i + lB + (L-1)B \times \left\lfloor \frac{i}{B} \right\rfloor\right), \quad \text{(Equation 2)}$$

$$i = 0, 1, \ldots, M_{symb}^{layer} - 1,$$

$$l = 0, 1, \ldots, L-1$$

$$M_{symb}^{layer} = M_{symb}^{CW}/L = B\mu$$

For all the above layer mapping schemes, the starting point for the RE mapping ($\{(k, l)\}$ where k and l denote frequency/sub-carrier and time/OFDM symbol indices, respectively) can depend on various factors such as whether the CSI-UCI symbols are multiplexed with data symbols or not, or whether some other signals (such as UL DMRS, UL SRS, HARQ-ACK symbols) are present. Furthermore, if two or more codeword segments for CSI-UCI are used, the starting point for RE mapping associated with different codeword segments can be different.

The following embodiments pertain to the multiplexing of CSI-UCI modulated symbols in the presence of UL-SCH data symbols.

When CSI-UCI is transmitted without UL-SCH data, it is treated "similar to data transmission" in the sense previously explained.

When CSI-UCI is transmitted with UL-SCH data (that is, UL grant including request for both data and CSI transmissions), after channel coding and modulation mapping, the modulated symbols associated with CSI-UCI (UL control symbols) are multiplexed with modulated symbols associated with data (UL data symbols).

For the schemes with two segments (two parts), a gNB can first decode codeword segment 1 (which includes RI) before the other segment(s). For instance, when RI is included in segment 1, once segment 1 is successfully decoded, the payload size of segment 2 (whose size is RI-dependent) is known based on the decoded RI value. To facilitate lower latency decoding (for both data and CSI-UCI), CSI-UCI segment 1 can be placed as early as possible in time within the UL subframe/slot which includes CSI-UCI (hence frequency-first mapping in the first few available OFDM symbols). The modulated symbols associated with codeword segment 2, on the other hand, can be multiplexed with data symbols in various manners. Some examples include distributed mapping and localized mapping (in time and/or frequency).

Figure 12:
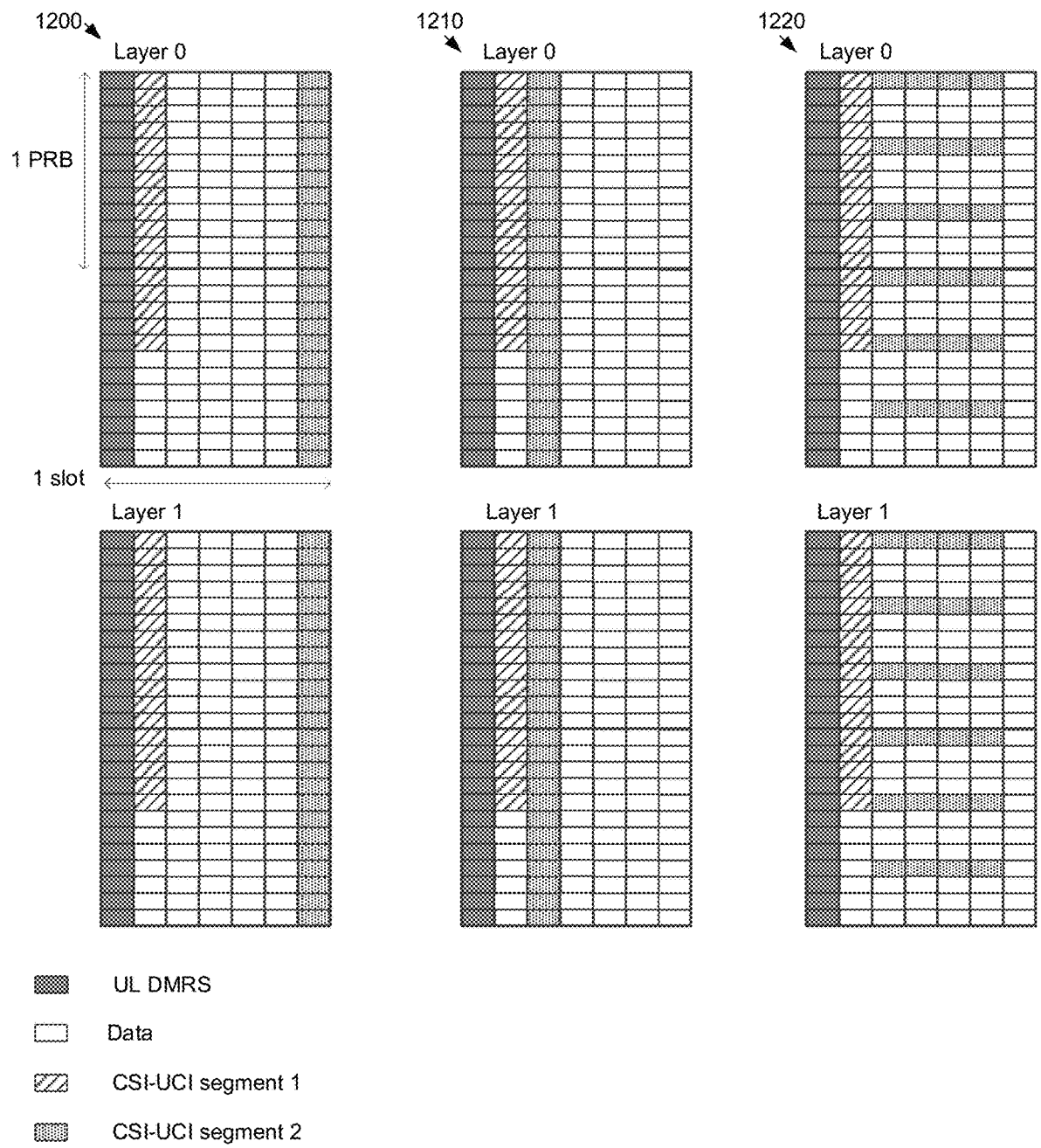
FIG. 12 illustrates several examples of multiplexing scheme wherein CSI-UCI is transmitted together with UL-SCH data according to embodiments of the present disclosure.

FIG. 12 illustrates several examples of multiplexing scheme wherein CSI-UCI is transmitted together with UL-SCH data. Two-layer transmission is requested with 2-PRB (one PRB includes 12 sub-carriers and one slot 7 OFDM symbols) resource allocation. Symbol-level vertical layer mapping is assumed for illustrative purposes. UL DMRS is assumed to be located in the first OFDM symbol. In the first example multiplexing scheme 1200, segment 2 is mapped toward the end of the slot to allow the gNB some decoding time for segment 1 before segment 2 can be decoded. In the second example multiplexing scheme 1210, segment 2 is mapped on the next OFDM symbol used for segment 1. Alternatively, segment 2 can be mapped right (consecutively) after segment 1. In the third example multiplexing scheme 1220, segment 2 is mapped in a distributed manner across the slot and PRBs. Other mapping schemes (patterns) can be inferred from the disclosed descriptions and examples in a straightforward manner by those skilled in the art.

Figure 13:
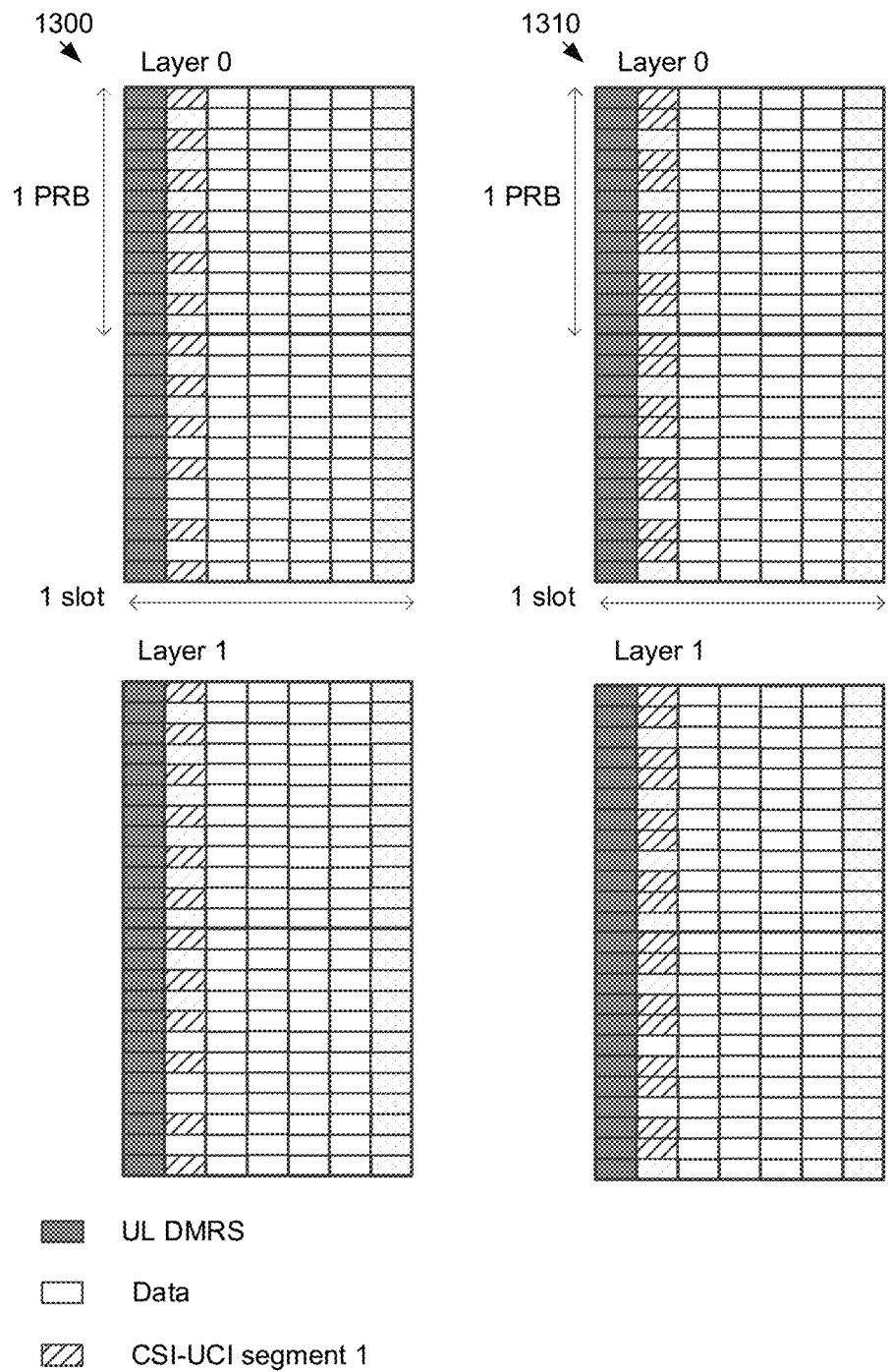
FIG. 13 illustrates an example for UCI multiplexing in case of two-segment UCI encoding according to an embodiment of the present disclosure.

In the examples illustrated in FIG. 12, segment 1 is mapped on the second OFDM symbol across a set of adjacent (contiguous) sub-carriers. Although such a localized mapping frequency domain allows a compact location of segment 1, it can lack frequency diversity. In a variation of the examples in FIG. 12, segment 1 is mapped in a distributed manner across the allocated set of PRBs. For example, the resulting symbols of segment 1 can be distributed more or less evenly across all the allocated set of PRBs. FIG. 13 illustrates several examples of segment 1 mapped on one OFDM symbols (in this illustration, in the second OFDM symbol) in this manner. Segment 2 is not depicted in this illustration. Two-layer transmission is requested with 2-PRB (one PRB including 12 sub-carriers and one slot 7 OFDM symbols) resource allocation. Symbol-level vertical layer mapping is assumed for illustrative purposes. UL DMRS is assumed to be located in the first OFDM symbol and segment 1 in the second OFDM symbol. In the example multiplexing scheme 1300, segment 1 occupies half of the allocated PRBs and is distributed evenly across the 2 allocated PRBs. In the example multiplexing scheme 1310, segment 1 occupies two third of the allocated PRBs and is distributed evenly across the 2 allocated PRBs. The portion of the allocated PRBS used for segment 1 can depend on the CSI-UCI payload as well as the MCS used for UCI (e.g., to meet the required BLER). Other mapping schemes (patterns) can be inferred from the disclosed descriptions and examples in a straightforward manner by those skilled in the art.

In the above examples, segment 1 is mapped on only one OFDM symbol and, furthermore, the earliest possible OFDM symbol (in this example, the second OFDM symbol since the first OFDM symbol is used for UL DMRS). When the payload of segment 1 CSI-UCI is large enough that more than one OFDM symbol is needed, n>1 earliest OFDM symbols can be used. If the first OFDM symbol in the slot is used for UL DMRS, the n OFDM symbols after the first symbol are used for segment 1. Both the localized and distributed mapping across sub-carriers within the allocated PRBs can be extended accordingly when n>1 OFDM symbols are used.

Each of the embodiments described for Component 4 applies (in general) for CSI reporting with reasonably large payload which involves at least one CSI parameter with RI-dependent payload size—either periodic, semi-persistent, or aperiodic; either wideband/partial-band (one report per a configured CSI reporting band) or subband (one report per subband within a configured CSI reporting band). The associated CSI-UCI can be transmitted via PUSCH by allocating a small number of PRBs or a fraction of PRB (a set of sub-carriers within one PRB and/or a set of OFDM symbols within one slot) of that allocated for UL-SCH data transmission (as indicated by resource allocation field in an UL-related DCI). Alternatively, the associated CSI-UCI can be transmitted via PUSCH by mapping it across using the same number of PRBs and/or OFDM symbols as that allocated for UL-SCH data transmission (as indicated by resource allocation field in an UL-related DCI)—the amount of time-frequency resource used for CSI-UCI transmission depends on the payload size and multiplexing scheme. As mentioned before, this can be done whether CSI-UCI is multiplexed with UL-SCH data or not.

Several variations of the above scheme can be as follows.

In one variation embodiment, both UL data and CSI-UCI are transmitted with a same number of layers (rank) wherein the number of layers is indicated in an associated UL-related DCI. The MCS used for CSI-UCI transmission is determined by the MCS assigned for UL data transmission with a certain offset (analogous to beta offset for LTE). This offset can be fixed in specification or can be configured either via higher-layer signaling, MAC CE, or L1 DL control signaling. When this offset is signaled via L1 control signaling, this offset can be included in the same UL-related DCI scheduling the UL data transmission. When this offset is fixed in the specification or configured via higher-layer signaling or MAC CE, the value of the offset can be either rank-dependent or rank-independent. For example, the offset can be larger or smaller for higher rank values. In addition, a minimum (lower bound) MCS for CSI-UCI can be defined to ensure that the MCS for CSI-UCI transmission does not fall below a certain value. Alternatively, instead of a minimum (lower bound) MCS, the MCS for CSI-UCI can be lowered, when necessary, using repetition coding.

In another variation embodiment, CSI-UCI can be transmitted with a different number of layers (rank) from UL data. For example, the number of layers used for CSI-UCI transmission is less than or equal to that used for UL data. In this case, both the number of layers and the MCS used for CSI-UCI transmission are determined by the number of layers and the MCS used for UL data transmission as indicated in an associated UL-related DCI, along with at least one offset value (analogous to beta offset for LTE). Here, the number of layers and the MCS used for CSI-UCI transmission can be either jointly or separately determined. An example procedure is as follows. For a given offset value, the MCS used for CSI-UCI transmission is first determined from the MCS used for UL data transmission. If the lowest MCS is still insufficiently low for the offset (e.g., not low enough to ensure that a required BLER target for CSI-UCI reception is attained), the rank for CSI-UCI transmission can be lowered. The process of determining MCS is then repeated for the lower rank value. Therefore, MCS and rank for CSI-UCI transmission are jointly determined based on the MCS and rank for UL data transmission as well as the offset(s).

In another variation embodiment, CSI-UCI can be transmitted with rank>1 only when the total payload for CSI-UCI is larger than X (where X can be fixed in specification or configured via higher-layer signaling). When CSI-UCI is transmitted together with data, a condition which can also be used (either in conjunction with another condition or separately) is when the data is transmitted with rank>1. Otherwise, CSI-UCI is transmitted with rank-1. Alternatively, this payload-dependent criterion can be linked (or implicitly used) with the channel coding scheme. That is, CSI-UCI can be transmitted with rank>1 only when channel coding scheme A is used (e.g., LDPC).

In another variation embodiment, when CSI-UCI is transmitted with rank-1 (one layer), several alternatives are applicable. In a first alternative, CSI-UCI symbols (after modulation mapping) can be repeated across all the layers used for UL data transmission. In a second alternative, CSI-UCI symbols (after modulation mapping) can be transmitted across all the layers with specification-transparent transmit diversity scheme. In a third alternative, CSI-UCI symbols (after modulation mapping) can be transmitted across all the layers with RE-level or PRB-level precoder cycling. In a fourth alternative, CSI-UCI symbols (after modulation mapping) can be transmitted across all the layers with an assigned rank-1 precoder (signaled to the UE via an UL-related UCI which includes the associated UL grant and CSI request). In a fifth alternative, CSI-UCI symbols (after modulation mapping) can be transmitted across all the layers with a rank-1 precoder determined by the UE.

Any of the above embodiments pertaining to aperiodic CSI (A-CSI)—such as the multi-segment UCI/CSI—can also be used for semi-persistent CSI (SP-CSI).

Any of the above variation embodiments can be utilized independently or in combination with at least one other variation embodiment.

Figure 14:
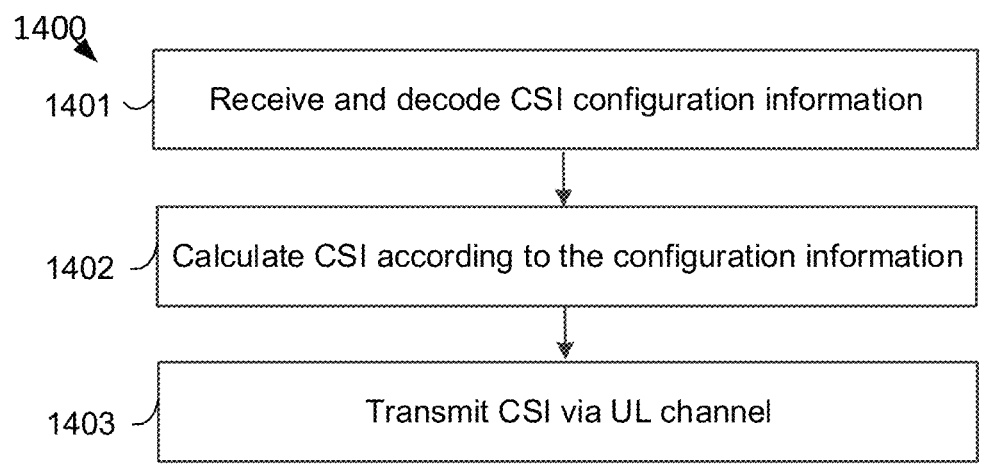
FIG. 14 illustrates a flowchart for an example method wherein a UE receives CSI configuration information and reports multi-segment CSI according to an embodiment of the present disclosure.

FIG. 14 illustrates a flowchart for an example method 1400 wherein a UE receives CSI configuration information and reports multi-segment CSI according to an embodiment of the present disclosure. For example, the method 1400 can be performed by the UE 116.

The method 1400 begins with the UE receiving and decoding CSI configuration information (step 1401). The UE then calculates a CSI according to the configuration information (step 1402) and transmits the CSI on an uplink (UL) channel (step 1403).

In this method, the CSI includes N>1 segments and is transmitted in one slot, and a first segment includes at least a rank indicator (RI) and at least one other CSI parameter. For example, N can be two where a first segment also includes a channel quality indicator (CQI) for a first codeword (CW). In another example, in addition to a CQI for a first CW, the first segment also includes two indicators that correspond to a number of reported wideband amplitude coefficients for a first and a second layer, respectively. This is prevalent for Type II CSI supported in NR. For both of these examples, a second segment includes CSI parameters associated with precoding matrix indicator (PMI). If the UE is configured for receiving up to 8 layers, the second segment also includes a CQI for a second CW when the reported RI in the first segment is greater than four. For all these examples, the first segment also includes CSI-reference-signal resource indicator (CRI).

Figure 15:
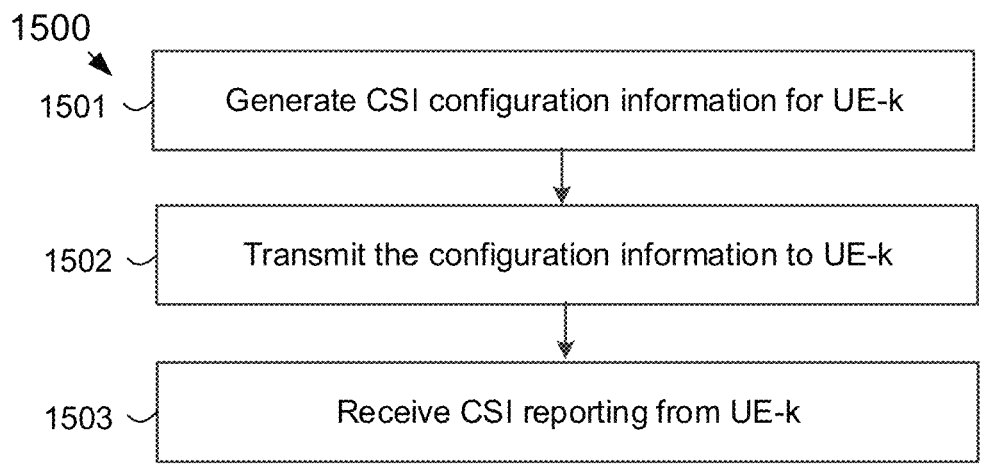
FIG. 15 illustrates a flowchart for an example method wherein a BS transmits CSI configuration information and receives multi-segment CSI reporting for a UE (labeled as UE-k) according to an embodiment of the present disclosure.

FIG. 15 illustrates a flowchart for an example method 1500 wherein a BS transmits CSI configuration information and receives multi-segment CSI reporting for a UE (labeled as UE-k) according to an embodiment of the present disclosure. For example, the method 1500 can be performed by the BS 102.

The method 1500 begins with the BS generating CSI configuration information for a UE (termed UE-k) (step 1501), followed by transmitting the CSI configuration information to UE-k (step 1502). The BS then receives CSI reporting from UE-k (step 1503).

In this method, the CSI includes N>1 segments and is transmitted in one slot, and a first segment includes at least a rank indicator (RI) and at least one other CSI parameter. For example, N can be two where a first segment also includes a channel quality indicator (CQI) for a first codeword (CW). In another example, in addition to a CQI for a first CW, the first segment also includes two indicators that correspond to a number of reported wideband amplitude coefficients for a first and a second layer, respectively. This is prevalent for Type II CSI supported in NR. For both of these examples, a second segment includes CSI parameters associated with precoding matrix indicator (PMI). If the UE is configured for receiving up to 8 layers, the second segment also includes a CQI for a second CW when the reported RI in the first segment is greater than four. For all these examples, the first segment also includes CSI-reference-signal resource indicator (CRI).

Although FIGS. 14 and 15 illustrate examples of methods for receiving configuration information and configuring a UE, respectively, various changes could be made to FIGS. 14 and 15. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A base station, comprising:
   a controller configured to determine configuration information for channel state information (CSI) reporting; and
   a transceiver operably coupled to the controller and configured to
      indicate, to a user equipment (UE), the configuration information for CSI reporting, the configuration information for CSI reporting including information for a CSI reporting band comprising one or more subbands from a bandwidth (BW) part for which the UE is to report CSI, and
      receive, from the UE, the CSI including two separately encoded segments, wherein:
         a first of the two segments includes a rank indicator (RI) and a channel quality indicator (CQI) for a first codeword (CW),
         a second of the two segments includes a precoding matrix indicator (PMI), and
         a payload size of and CSI parameters encoded in the second of the two segments depends on a value of the RI included in the first of the two segments.

2. The base station of claim 1, wherein the CSI reporting includes one of one report for all subbands within the CSI reporting band and multiple reports for the subbands within the CSI reporting band.

3. The base station of claim 1, wherein, when one report for all subbands within the CSI reporting band is indicated, a single CQI and a single PMI is reported for the CSI reporting band.

4. The base station of claim 1, wherein, when multiple reports for the subbands within the CSI reporting band is indicated, one CQI is reported for each subband within the CSI reporting band and one PMI for the CSI reporting band and one PMI for each subband within the CSI reporting band are reported.

5. The base station of claim 1, wherein the transceiver is configured to indicate to the UE that one or more of wideband CSI and subband CSI is to be reported.

6. The base station of claim 5, wherein an indication to the UE that wideband CSI is to be reported includes an indication of at least one of wideband CQI and wideband PMI, and
an indication to the UE that subband CSI is to be reported includes an indication of at least one of subband CQI and subband PMI.

7. The base station of claim 1, wherein the one or more subbands includes non-contiguous subbands within the BW part.

8. The base station of claim 1, wherein the second of the two segments includes a CQI for a second CW in case that the RI is larger than 4.

9. A method, comprising:
determining configuration information for channel state information (CSI) reporting;
indicating, to a user equipment (UE), the configuration information for CSI reporting, the configuration information for CSI reporting including information for a CSI reporting band comprising one or more subbands from a bandwidth (BW) part for which the UE is to report CSI; and
receiving, from the UE, the CSI including two separately encoded segments,
wherein:
a first of the two segments includes a rank indicator (RI) and a channel quality indicator (CQI) for a first codeword (CW),
a second of the two segments includes a precoding matrix indicator (PMI), and
a payload size of and CSI parameters encoded in the second of the two segments depends on a value of the RI included in the first of the two segments.

10. The method of claim 9, wherein CSI reporting includes one of one report for all subbands within the CSI reporting band and multiple reports for the subbands within the CSI reporting band.

11. The method of claim 9, wherein, when one report for all subbands within the CSI reporting band is indicated, a single CQI and a single PMI is reported for the CSI reporting band.

12. The method of claim 9, wherein, when multiple reports for the subbands within the CSI reporting band is indicated, one CQI is reported for each subband within the CSI reporting band and one PMI for the CSI reporting band and one PMI for each subband within the CSI reporting band are reported.

13. The method of claim 9, further comprising:
indicating to the UE that one or more of wideband CSI and subband CSI is to be reported.

14. The method of claim 13, wherein an indication to the UE that wideband CSI is to be reported includes an indication of at least one of wideband CQI and wideband PMI, and
an indication to the UE that subband CSI is to be reported includes an indication of at least one of subband CQI and subband PMI.

15. The method of claim 9, wherein the one or more subbands includes non-contiguous subbands within the BW part.

16. The method of claim 9, wherein the second of the two segments includes a CQI for a second CW in case that the RI is larger than 4.

17. A user equipment (UE), comprising:
a transceiver configured to receive, from a base station (BS), an indication of configuration information for channel state information (CSI) reporting, the configuration information for CSI reporting including information for a CSI reporting band comprising one or more subbands from a bandwidth (BW) part for which the UE is to report CSI; and
a controller operably coupled to the transceiver and configured to determine CSI,
wherein the transceiver is further configured to report the determined CSI including two separately encoded segments, and
wherein:
a first of the two segments includes a rank indicator (RI) and a channel quality indicator (CQI) for a first codeword (CW),
a second of the two segments includes a precoding matrix indicator (PMI), and
a payload size of and CSI parameters encoded in the second of the two segments depends on a value of the RI included in the first of the two segments.

18. The UE of claim 17, wherein the CSI reporting includes one of one report for all subbands within the CSI reporting band and multiple reports for the subbands within the CSI reporting band.

19. The UE of claim 17, wherein, when one report for all subbands within the CSI reporting band is indicated, a single CQI and a single PMI is reported for the CSI reporting band.

20. The UE of claim 17, wherein, when multiple reports for the subbands within the CSI reporting band is indicated, one CQI is reported for each subband within the CSI reporting band and one PMI for the CSI reporting band and one PMI for each subband within the CSI reporting band are reported.

21. The UE of claim 17, wherein the transceiver is configured to receive an indication that one or more of wideband CSI and subband CSI is to be reported.

22. The UE of claim 21, wherein an indication to the UE that wideband CSI is to be reported includes an indication of at least one of wideband CQI and wideband PMI, and
an indication to the UE that subband CSI is to be reported includes an indication of at least one of subband CQI and subband PMI.

23. The UE of claim 17, wherein the second of the two segments includes a CQI for a second CW in case that the RI is larger than 4.

* * * * *